(12) United States Patent
Sakhnini et al.

(10) Patent No.: US 12,355,686 B2
(45) Date of Patent: Jul. 8, 2025

(54) GUARD INTERVAL-BASED ORTHOGONAL TIME FREQUENCY SPACE WAVEFORM

(71) Applicant: QUALCOMM Incorporated, San Diego, CA (US)

(72) Inventors: Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 398 days.

(21) Appl. No.: 18/063,042

(22) Filed: Dec. 7, 2022

(65) Prior Publication Data

US 2024/0195547 A1 Jun. 13, 2024

(51) Int. Cl.
*H04L 5/00* (2006.01)
*H04L 27/26* (2006.01)

(52) U.S. Cl.
CPC ........ *H04L 5/0023* (2013.01); *H04L 27/2605* (2013.01)

(58) Field of Classification Search
None
See application file for complete search history.

(56) References Cited

U.S. PATENT DOCUMENTS

2022/0393921 A1* 12/2022 Pfadler ............... H04L 25/0224

* cited by examiner

*Primary Examiner* — Diane L Lo
(74) *Attorney, Agent, or Firm* — Harrity & Harrity, LLP

(57) ABSTRACT

Various aspects of the present disclosure generally relate to wireless communication. In some aspects, a transmitter network node may generate a guard interval (GI)-based orthogonal time frequency space (OTFS) waveform comprising at least one defined sequence associated with at least one GI in a time domain corresponding to the GI-based OTFS waveform. The transmitter network node may transmit at least one signal based on the GI-based OTFS waveform. Numerous other aspects are described.

30 Claims, 14 Drawing Sheets

1100

1110 — Generate a guard interval (GI)-based orthogonal time frequency space (OTFS) waveform comprising at least one defined sequence associated with at least one GI in a time domain corresponding to the GI-based OTFS waveform 1120 — Transmit at least one signal based on the GI-based OTFS waveform

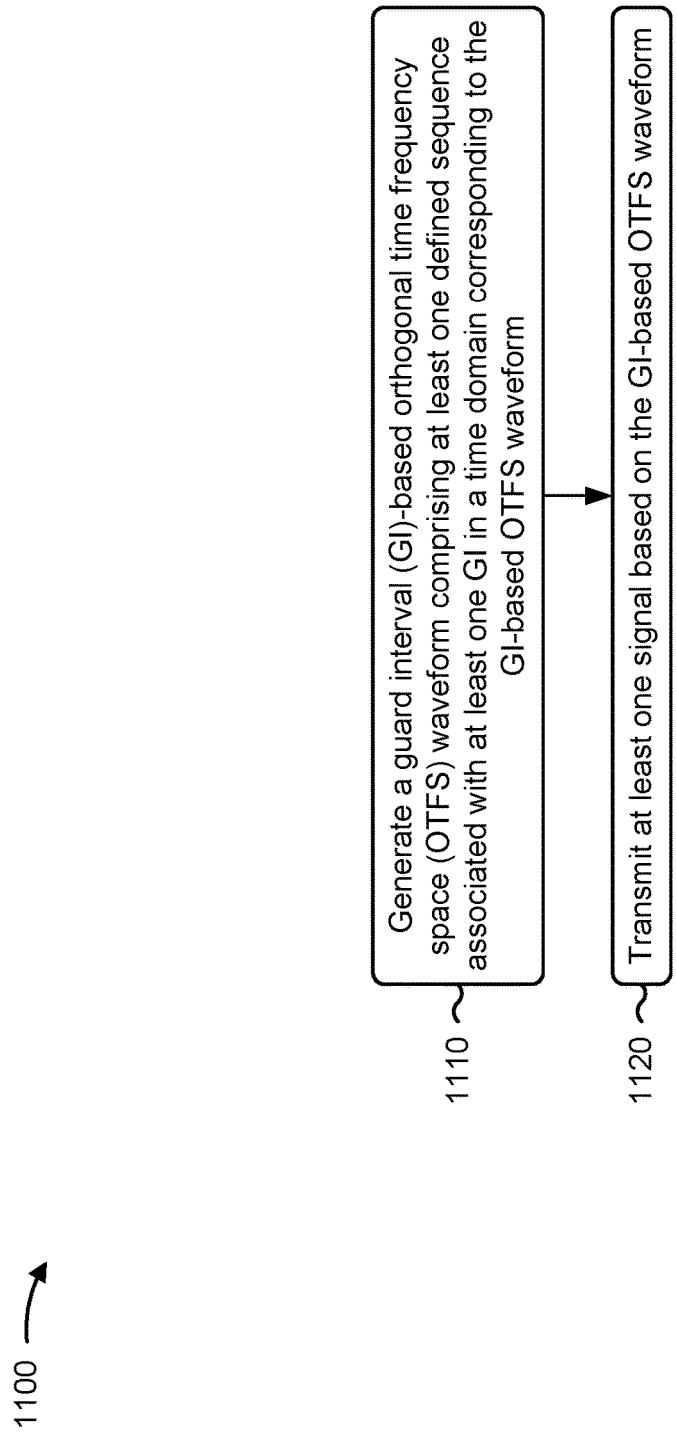

GUARD INTERVAL-BASED ORTHOGONAL TIME FREQUENCY SPACE WAVEFORM

FIELD OF THE DISCLOSURE

Aspects of the present disclosure generally relate to wireless communication and to techniques and apparatuses for guard interval-based orthogonal time frequency space waveform.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a transmitter network node for wireless communication. The transmitter network node may include a memory and one or more processors coupled to the memory. The one or more processors may be configured to generate a guard interval (GI)-based orthogonal time frequency space (OTFS) waveform comprising at least one defined sequence associated with at least one GI in a time domain corresponding to the GI-based OTFS waveform. The one or more processors may be configured to transmit at least one signal based on the GI-based OTFS waveform.

Some aspects described herein relate to a receiver network node for wireless communication. The receiver network node may include a memory and one or more processors coupled to the memory. The one or more processors may be configured to receive at least one signal based on a GI-based OTFS waveform comprising at least one defined sequence associated with at least one GI in a time domain. The one or more processors may be configured to decode the at least one signal based on the at least one defined sequence.

Some aspects described herein relate to a method of wireless communication performed by a transmitter network node. The method may include generating a GI-based OTFS waveform comprising at least one defined sequence associated with at least one GI in a time domain corresponding to the GI-based OTFS waveform. The method may include transmitting at least one signal based on the GI-based OTFS waveform.

Some aspects described herein relate to a method of wireless communication performed by a receiver network node. The method may include receiving at least one signal based on a GI-based OTFS waveform comprising at least one defined sequence associated with at least one GI in a time domain. The method may include decoding the at least one signal based on the at least one defined sequence.

Some aspects described herein relate to a non-transitory computer-readable medium that stores a set of instructions for wireless communication by a transmitter network node. The set of instructions, when executed by one or more processors of the transmitter network node, may cause the transmitter network node to generate a GI-based OTFS waveform comprising at least one defined sequence associated with at least one GI in a time domain corresponding to the GI-based OTFS waveform. The set of instructions, when executed by one or more processors of the transmitter network node, may cause the transmitter network node to transmit at least one signal based on the GI-based OTFS waveform.

Some aspects described herein relate to a non-transitory computer-readable medium that stores a set of instructions for wireless communication by a receiver network node. The set of instructions, when executed by one or more processors of the receiver network node, may cause the receiver network node to receive at least one signal based on a GI-based OTFS waveform comprising at least one defined sequence associated with at least one GI in a time domain. The set of instructions, when executed by one or more processors of the receiver network node, may cause the receiver network node to decode the at least one signal based on the at least one defined sequence.

Some aspects described herein relate to an apparatus for wireless communication. The apparatus may include means for generating a GI-based OTFS waveform comprising at least one defined sequence associated with at least one GI in a time domain corresponding to the GI-based OTFS waveform. The apparatus may include means for transmitting at least one signal based on the GI-based OTFS waveform.

Some aspects described herein relate to an apparatus for wireless communication. The apparatus may include means for receiving at least one signal based on a GI-based OTFS waveform comprising at least one defined sequence associated with at least one GI in a time domain. The apparatus may include means for decoding the at least one signal based on the at least one defined sequence.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 11 is a diagram illustrating an example process performed, for example, by a transmitter network node, in accordance with the present disclosure.

DETAILED DESCRIPTION

Figure 1:
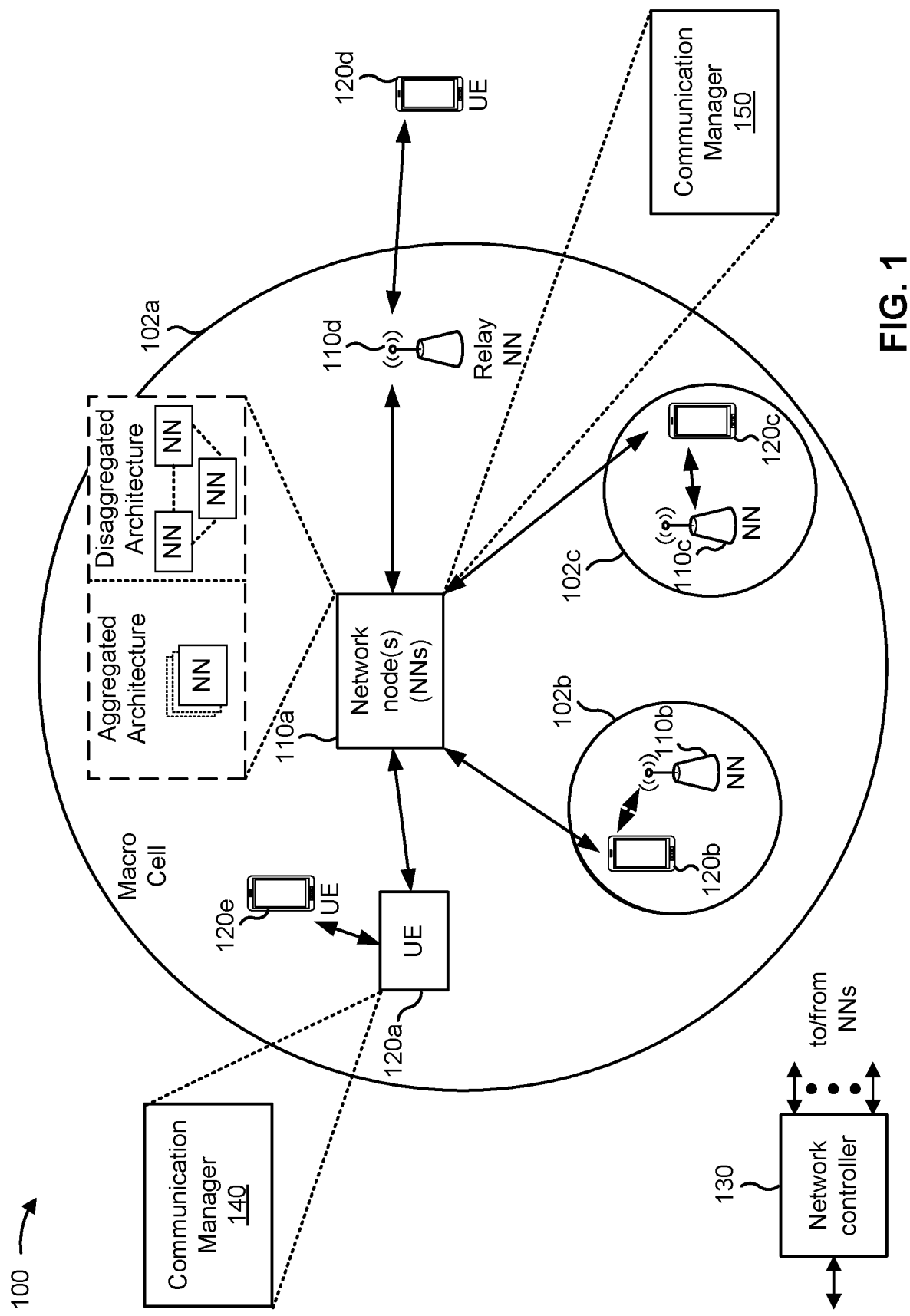
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects and examples generally include a method, apparatus, network node, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a transmitter network node (e.g., the network node 110 or the UE 120) may include a communication manager 140 or a communication manager 150. As described in more detail elsewhere herein, the communication manager 140 or 150 may generate a guard interval (GI)-based orthogonal time frequency space (OTFS) waveform comprising at least one defined sequence associated with at least one GI in a time domain corresponding to the GI-based OTFS waveform; and transmit at least one signal based on the GI-based OTFS waveform. In some aspects, the communication manager 140 or 150 may receive at least one signal based on a GI-based OTFS waveform comprising at least one defined sequence associated with at least one GI in a time domain; and decode the at least one signal based on the at least one defined sequence. Additionally, or alternatively, the communication manager 140 or 150 may perform one or more other operations described herein.

As indicated above, FIG. 1 is provided as an example. Other examples may differ from what is described with regard to FIG. 1.

Figure 2:
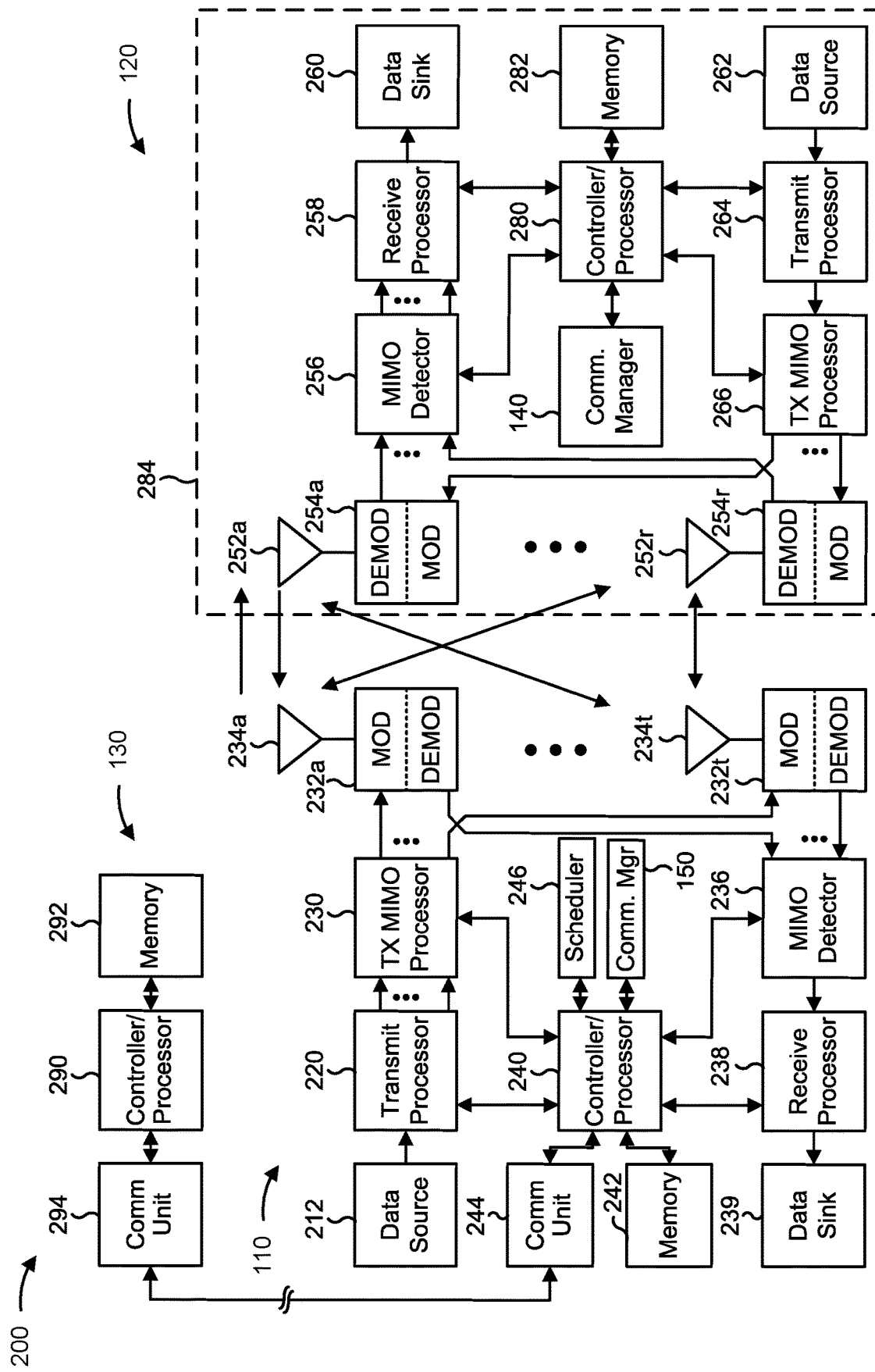
FIG. 2 is a diagram illustrating an example of a network node in communication with a user equipment in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

Each of the antenna elements may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a network node, such as for millimeter wave communications and/or the like. In such a case, the network node may provide the UE with a configuration of transmission configuration indicator (TCI) states that respectively indicate beams that may be used by the UE, such as for receiving a physical downlink shared channel (PDSCH). A TCI state indicates a spatial parameter for a communication. For example, a TCI state for a communication may identify a source signal (such as a synchronization signal block, a channel state information reference signal, or the like) and a spatial parameter to be derived from the source signal for the purpose of transmitting or receiving the communication. For example, the TCI state may indicate a quasi-co-location (QCL) type. A QCL type may indicate one or more spatial parameters to be derived from the source signal. The source signal may be referred to as a QCL source. The network node may indicate an activated TCI state to the UE, which the UE may use to select a beam for receiving the PDSCH.

A beam indication may be, or include, a TCI state information element, a beam identifier (ID), spatial relation information, a TCI state ID, a closed loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a QCL type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

The beam indication may be a joint or separate downlink (DL)/uplink (UL) beam indication in a unified TCI framework. In some cases, the network may support layer 1 (L1)-based beam indication using at least UE-specific (unicast) downlink control information (DCI) to indicate joint or separate DL/UL beam indications from active TCI states. In some cases, existing DCI formats 1_1 and/or 1_2 may be reused for beam indication. The network may include a support mechanism for a UE to acknowledge successful decoding of a beam indication. For example, the acknowledgment/negative acknowledgment (ACK/NACK) of the PDSCH scheduled by the DCI carrying the beam indication may be also used as an ACK for the DCI.

Beam indications may be provided for carrier aggregation (CA) scenarios. In a unified TCI framework, information the network may support common TCI state ID update and activation to provide common QCL and/or common UL transmission spatial filter or filters across a set of configured component carriers (CCs). This type of beam indication may apply to intra-band CA, as well as to joint DL/UL and separate DL/UL beam indications. The common TCI state ID may imply that one reference signal (RS) determined according to the TCI state(s) indicated by a common TCI state ID is used to provide QCL Type-D indication and to determine UL transmission spatial filters across the set of configured CCs.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 9-13).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 9-13).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, and/or any other component(s) of FIG. 2 may perform one or more techniques associated with GI-based OTFS waveforms, as described in more detail elsewhere herein. For example, the controller/processor 240 of the network node 110, the controller/processor 280 of the UE 120, and/or any other component(s) of FIG. 2 may perform or direct operations of, for example, process 1100 of FIG. 11, process 1200 of FIG. 12, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, a transmitter network node (e.g., network node 110 or UE 120) includes means for generating a GI-based OTFS waveform comprising at least one defined sequence associated with at least one GI in a time domain corresponding to the GI-based OTFS waveform; and/or means for transmitting at least one signal based on the GI-based OTFS waveform. The means for the transmitter network node to perform operations described herein may include, for example, one or more of communication manager 140, communication manager 150, transmit processor 220, transmit processor 264, TX MIMO processor 230, TX MIMO processor 266, modem 232, modem 254, antenna 234, antenna 252, MIMO detector 236, MIMO detector 256, receive processor 238, receive processor 258, controller/processor 240, controller/processor 280, memory 242, memory 282, or scheduler 246

In some aspects, a receiver network node (e.g., network node 110 or UE 120) includes means for receiving at least one signal based on a GI-based OTFS waveform comprising at least one defined sequence associated with at least one GI in a time domain; and/or means for decoding the at least one signal based on the at least one defined sequence. The means for the receiver network node to perform operations described herein may include, for example, one or more of communication manager 140, communication manager 150, transmit processor 220, transmit processor 264, TX MIMO processor 230, TX MIMO processor 266, modem 232, modem 254, antenna 234, antenna 252, MIMO detector 236, MIMO detector 256, receive processor 238, receive processor 258, controller/processor 240, controller/processor 280, memory 242, memory 282, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
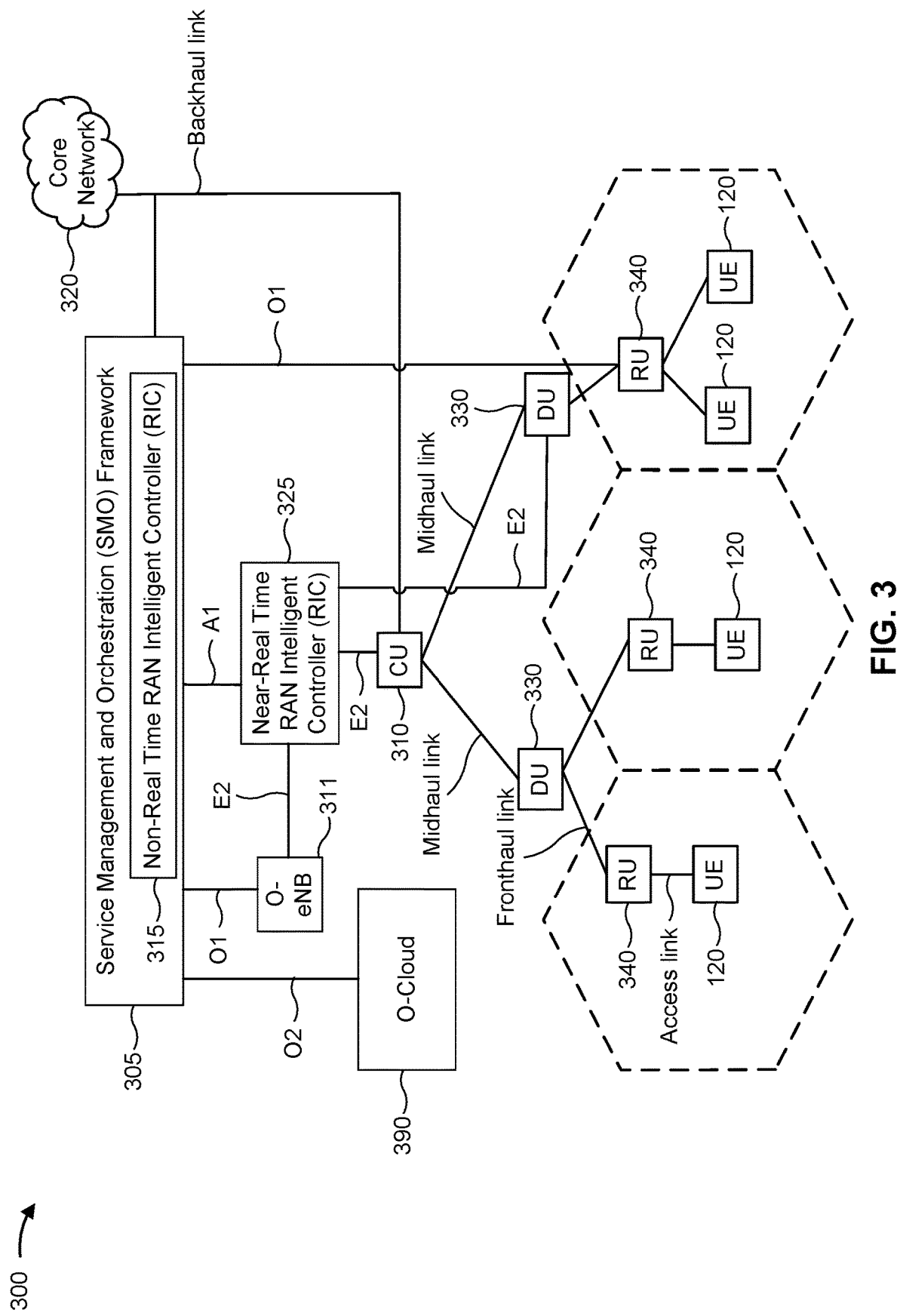
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium.

Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an IFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
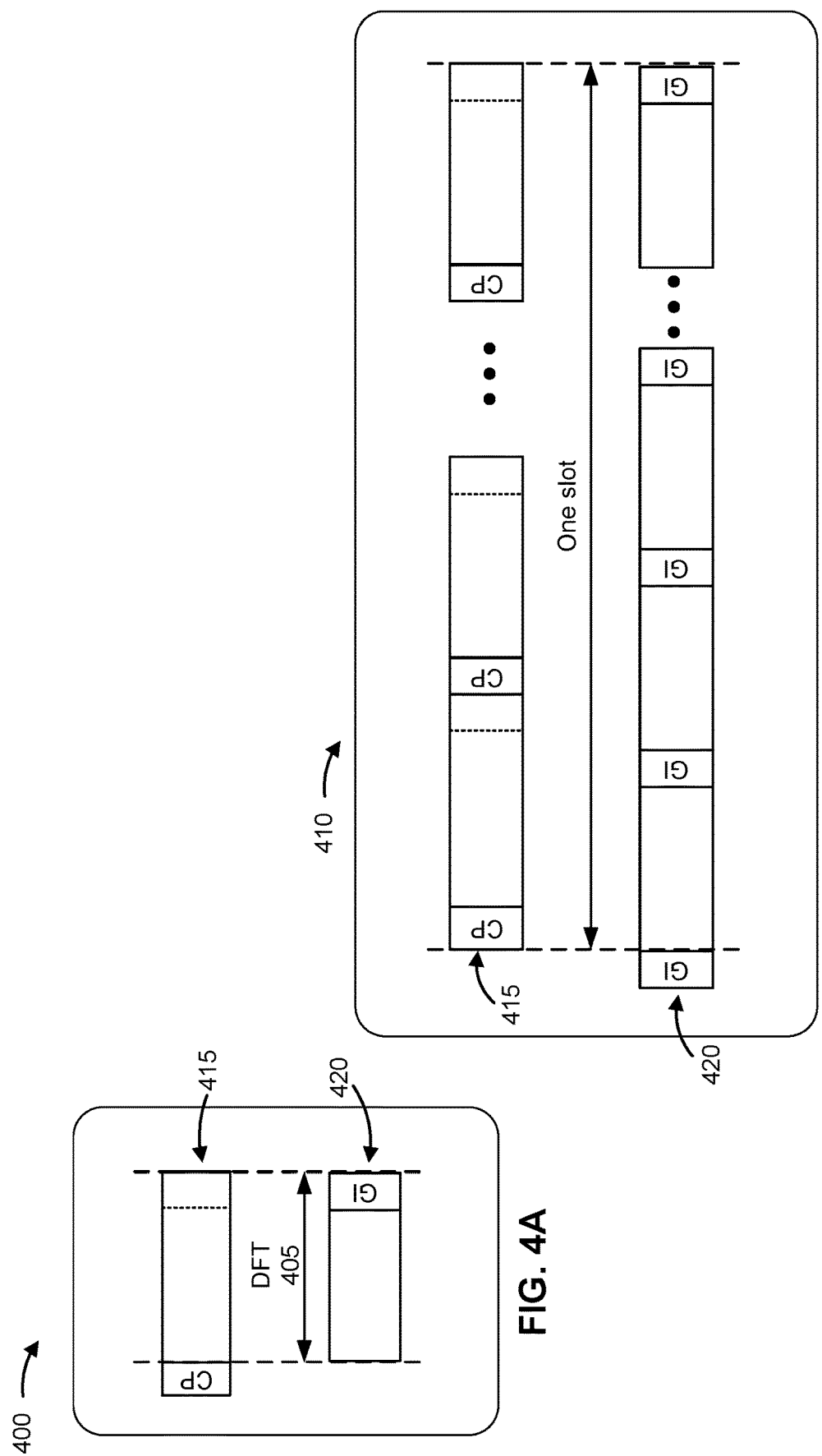
FIGS. 4A and 4B are diagrams illustrating examples of the use of cyclic prefix and guard interval (GI) for single-carrier waveforms, in accordance with the present disclosure.

FIGS. 4A and 4B are diagrams illustrating examples of the use of cyclic prefix (CP) and guard interval (GI) for single-carrier (SC) waveforms, in accordance with the present disclosure. FIG. 4A illustrates an example 400 of a symbol having a discrete Fourier transform (DFT) processing duration 405 and FIG. 4B illustrates an example 410 of a slot having a number of symbols. As shown, a communication 415 may utilize CP, and a communication 420 may use GI.

CP and/or GI may be used to convert the linear convolution of transmitted symbols with the channel to a circular convolution to facilitate a one-tap frequency domain equalization at the receiver. In this way, CP and GI may be used, for example, to avoid inter-symbol interference and/or maintain alignment of symbols and/or slots. CP is generally contained within a slot, but, as shown in FIG. 4A, is outside of a DFT processing duration 405 within a symbol, whereas GI is within the DFT processing duration 405. However, as shown in FIG. 4B, GI is not necessarily contained within a slot. CP is generated using random data, whereas GI is generated using a known sequence.

GI sequences may be of different GI sequence types such as, for example, zero GI sequences and non-zero GI sequences. Non-zero GI sequences allow for use of the GI for channel estimation, tracking, and/or phase noise compensation, among other examples. Non-zero GI sequences also can provide better peak-to-average power ratio (PAPR) and out of band (OOB) leakage. Zero GI sequences allow for more efficient intra-symbol multiplexing. Zero GI sequences also allow a receiver device to process only a fraction of a symbol.

As indicated above, FIGS. 4A and 4B are provided as examples. Other examples may differ from what is described with regard to FIGS. 4A and 4B.

Figure 5:
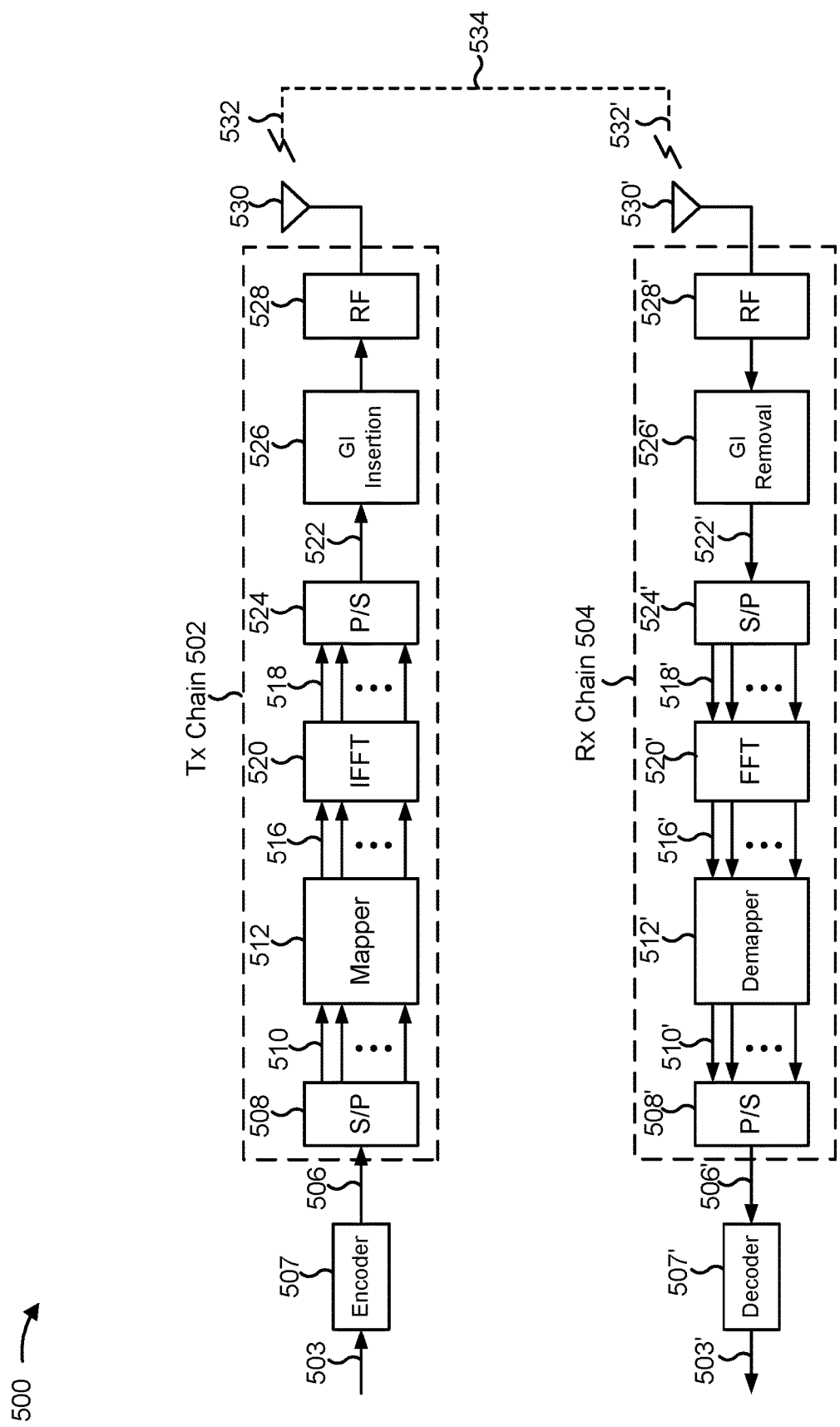
FIG. 5 is a diagram illustrating an example of a transmit chain and a receive chain of a wireless communication device, in accordance with the present disclosure.

FIG. 5 is a diagram illustrating an example 500 of a transmit (Tx) chain 502 and a receive (Rx) chain 504 of a wireless communication device, in accordance with the present disclosure. The wireless communication device may be a network node such as network node 110 depicted in FIGS. 1-2, UE 120 depicted in FIGS. 1-3, and/or one or more components of a disaggregated base station architecture 300 depicted in FIG. 3. In some aspects, one or more components of Tx chain 502 may be implemented in transmit processor 264, TX MIMO processor 266, MOD/DEMOD 254, and/or controller/processor 280, as described above in connection with FIG. 2. In some aspects, Tx chain 502 may be implemented in the UE 120 for transmitting data 506 (e.g., uplink data, an uplink reference signal, uplink control information) to network node 110 on an uplink channel. In some aspects, one or more components of Tx chain 502 may be implemented in transmit processor 220, TX MIMO processor 230, MOD/DEMOD 234, and/or controller/processor 240, as described above in connection with FIG. 2. In some aspects, Tx chain 502 may be implemented in the network node 110 for transmitting data 506 (e.g., uplink data, an uplink reference signal, uplink control information, and/or the like) to the UE 120 on a downlink channel.

An encoder 507 may alter a signal (e.g., a bitstream) 503 into data 506. Data 506 to be transmitted is provided from encoder 507 as input to a serial-to-parallel (S/P) converter 508. In some aspects, S/P converter 508 may split the transmission data into N parallel data streams 510.

The N parallel data streams 510 may then be provided as input to a mapper 512. Mapper 512 may map the N parallel data streams 510 onto N constellation points. The mapping may be done using a modulation constellation, such as binary phase-shift keying (BPSK), quadrature phase-shift keying (QPSK), 8 phase-shift keying (8PSK), quadrature amplitude modulation (QAM), etc. Thus, mapper 512 may output N parallel symbol streams 516, each symbol stream 516 corresponding to one of N orthogonal subcarriers of an inverse fast Fourier transform (IFFT) component 520. These N parallel symbol streams 516 are represented in the frequency domain and may be converted into N parallel time domain sample streams 518 by IFFT component 520.

In some aspects, N parallel modulations in the frequency domain correspond to N modulation symbols in the frequency domain, which correspond to N mapping and N-point IFFT in the frequency domain, which are equal to one (useful) OFDM symbol in the time domain, which is equal to N samples in the time domain. One OFDM symbol in the time domain, Ns, is equal to Ncp (the number of guard samples per OFDM symbol)+N (the number of useful samples per OFDM symbol).

The N parallel time domain sample streams 518 may be converted into an OFDM/OFDMA symbol stream 522 by a parallel-to-serial (P/S) converter 524. A GI insertion component 526 may insert a GI between successive OFDM/OFDMA symbols in the OFDM/OFDMA symbol stream 522. The output of GI insertion component 526 may then be upconverted to a desired transmit frequency band by a radio frequency (RF) front end 528. An antenna 530 may then transmit the resulting signal 532.

In some aspects, Rx chain 504 may utilize OFDM/OFDMA. In some aspects, one or more components of Rx chain 504 may be implemented in receive processor 258, MIMO detector 256, MOD/DEMOD 254, and/or controller/processor 280, as described above in connection with FIG. 2. In some aspects, Rx chain 504 may be implemented in the UE 120 for receiving data 506 (e.g., downlink data, a downlink reference signal, downlink control information, and/or the like) from the network node 110 on a downlink channel. In some aspects, one or more components of Rx chain 504 may be implemented in receive processor 238, MIMO detector 236, MOD/DEMOD 234, and/or controller/processor 240, as described above in connection with FIG. 2. In some aspects, Rx chain 504 may be implemented in the network node 110 for receiving data 506 (e.g., uplink data, an uplink reference signal, uplink control information, and/or the like) from the UE 120 on an uplink channel.

A transmitted signal 532 is shown traveling over a wireless channel 534 from Tx chain 502 to Rx chain 504. When a signal 532' is received by an antenna 530', the received signal 532' may be downconverted to a baseband signal by an RF front end 528'. A GI removal component 526' may then remove the GI that was inserted between OFDM/OFDMA symbols by guard insertion component 526.

The output of GI removal component 526' may be provided to an S/P converter 524'. The output may include an OFDM/OFDMA symbol stream 522', and S/P converter 524' may divide the OFDM/OFDMA symbol stream 522' into N parallel time-domain symbol streams 518', each of which corresponds to one of the N orthogonal subcarriers. An FFT component 520' may convert the N parallel time-domain symbol streams 518' into the frequency domain and output N parallel frequency-domain symbol streams 516'.

A demapper 512' may perform the inverse of the symbol mapping operation that was performed by mapper 512, thereby outputting N parallel data streams 510'. A P/S converter 508' may combine the N parallel data streams 510' into a single data stream 506'. Ideally, data stream 506' corresponds to data 506 that was provided as input to Tx chain 502. Data stream 506' may be decoded into a decoded data stream 503' by decoder 507'.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of components (e.g., one or more components) shown in FIG. 5 may perform one or more functions described as being performed by another set of components shown in FIG. 5.

As indicated above, FIG. 5 is provided as an example. Other examples may differ from what is described with regard to FIG. 5.

Figure 6:
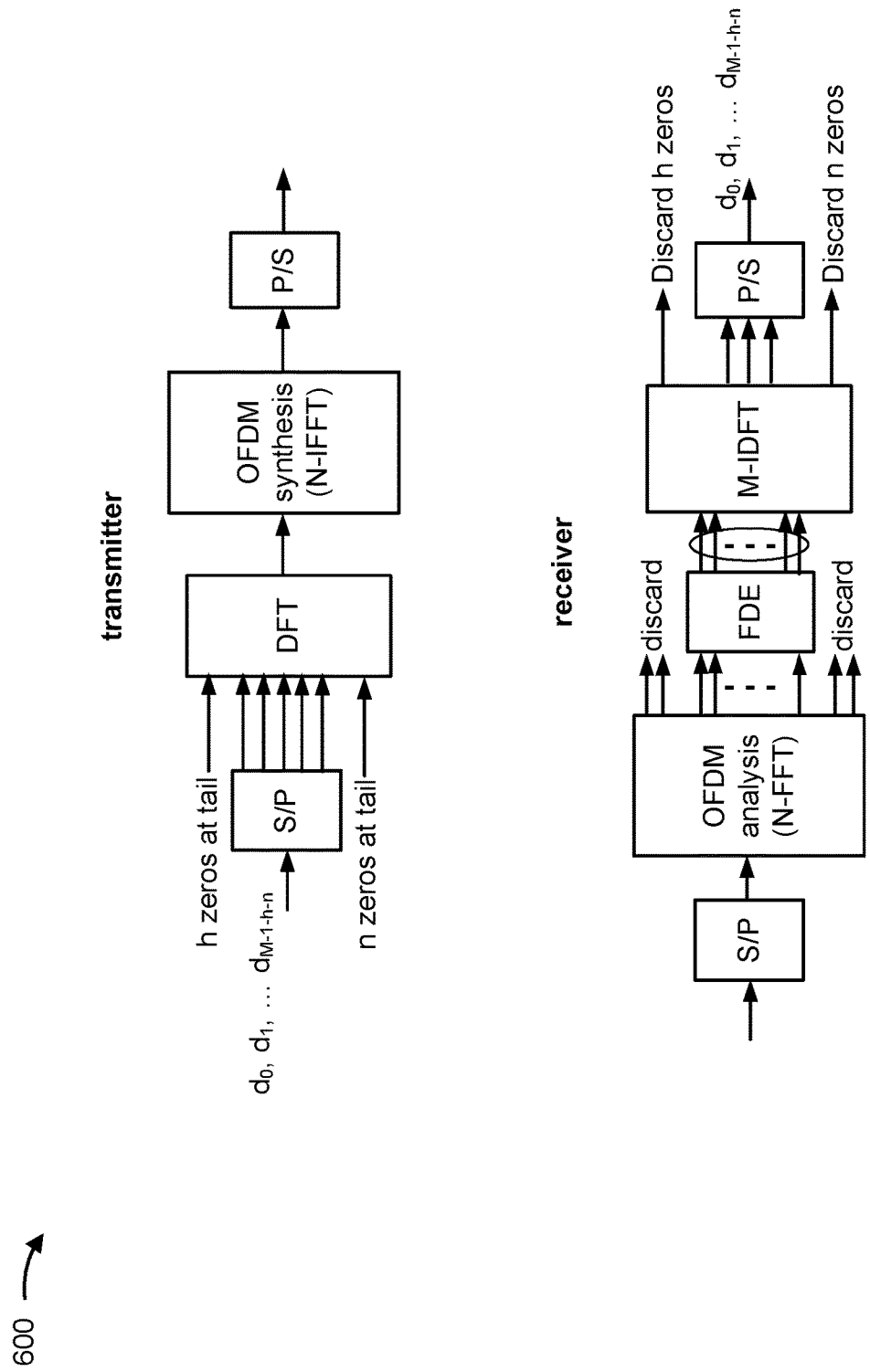
FIG. 6 is a diagram illustrating an example of generating a GI-based waveform, in accordance with the present disclosure.

FIG. 6 is a diagram illustrating an example 600 of generating a GI-based waveform, in accordance with the present disclosure.

Some communications may use a CP to help eliminate inter-symbol interference. The CP may be a repetition of information from a previous symbol that is used as a guard against inter-symbol interference (ISI).

A GI-based waveform can adapt to different delay spreads without changing symbol duration and achieve better resource utilization. The GI-based waveform may be extended to DFT-s-OFDM. Some solutions may produce zero-tail (ZT) DFT-s-OFDM signals by adding zeros prior to DFT input. The resulting communication may include data content and tail samples at the end to help mitigate interference. Example 600 shows components in a transmission chain of a transmitter device. The wireless communication device may be a network node such as network node 110 depicted in FIGS. 1-2, UE 120 depicted in FIGS. 1-3, and/or one or more components of a disaggregated base station architecture 300 depicted in FIG. 3. The transmitter device may communicate using a wireless link to a receiver device, which may be a network node. The transmitter device may include an S/P converter, a DFT component that spreads an uplink shared channel, an IFFT component that performs an inverse FFT to prepare the uplink shared channel or output signal for transmission, and a P/S converter. The transmitter device may generate a first communication that includes a GI at a start of the first communication, data content, and tail samples at an end of the first communication. The first communication may be a single symbol of a larger communication or may include multiple symbols.

The transmitter device may concatenate, before a DFT multiplexing operation by the DFT component for the first communication, modulated samples for data content and fill samples. The fill samples may be, for example, random modulated samples, repeated data modulation samples, reference signal samples, or low energy samples (e.g., zeros). In example 600, the fill samples are shown as zeros.

However, a zero-sample GI is not usable for tracking or channel estimation. Due to the oversampling (different DFT and IFFT size), the GIs in the IFFT output are not zero samples anymore, which introduces the imperfection on the circular property for FFT operation.

As indicated above, FIG. 6 is provided as an example. Other examples may differ from what is described with regard to FIG. 6.

Figure 7:
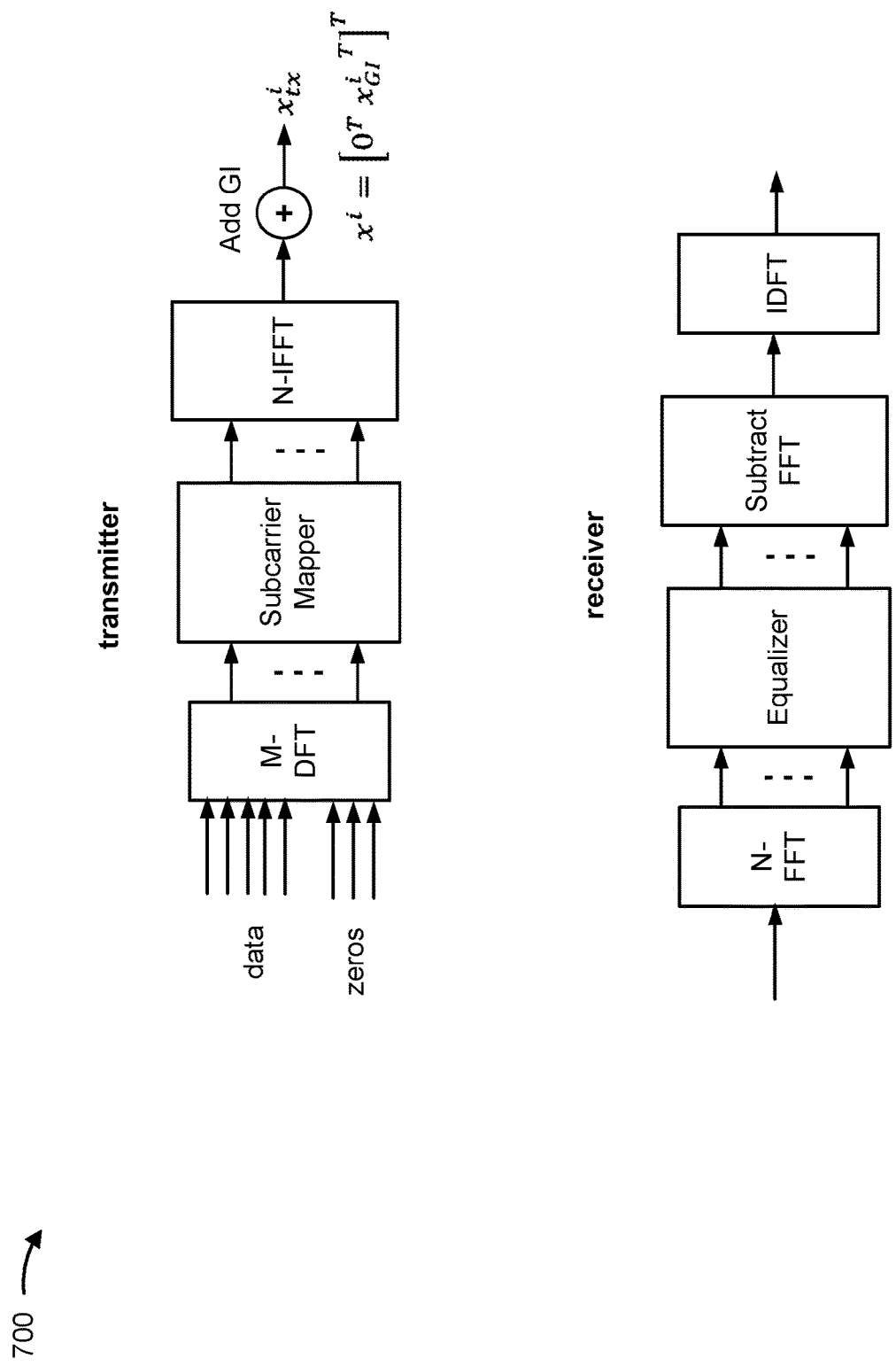
FIG. 7 is a diagram illustrating an example of generating a GI-based waveform, in accordance with the present disclosure.

FIG. 7 is a diagram illustrating an example 700 of generating a GI-based waveform, in accordance with the present disclosure.

Example 700 shows data and zeros that are input into an M-point DFT to help create zero tails for DFT-s-OFDM. The DFT output proceeds through a subcarrier mapper and an N-point IFFT. Example 700 further shows that Zadoff-Chu (ZC) sequences can be added as GI sequences after an IFFT output. The receiver may subtract the impact of any GI sequences. While known signals may be used for GI sequences, to achieve flexible adaptation to delay spread and to enable tracking, such GIs still suffer from the imperfection on the circular property for FFT operation. The GI sequences may only be utilized in the IFFT domain. That is, the receiver may have to perform FFT, equalization, and then return to IFFT. These additional computations may consume processing resources.

As indicated above, FIG. 7 is provided as an example. Other examples may differ from what is described with regard to FIG. 7.

Figure 8A:
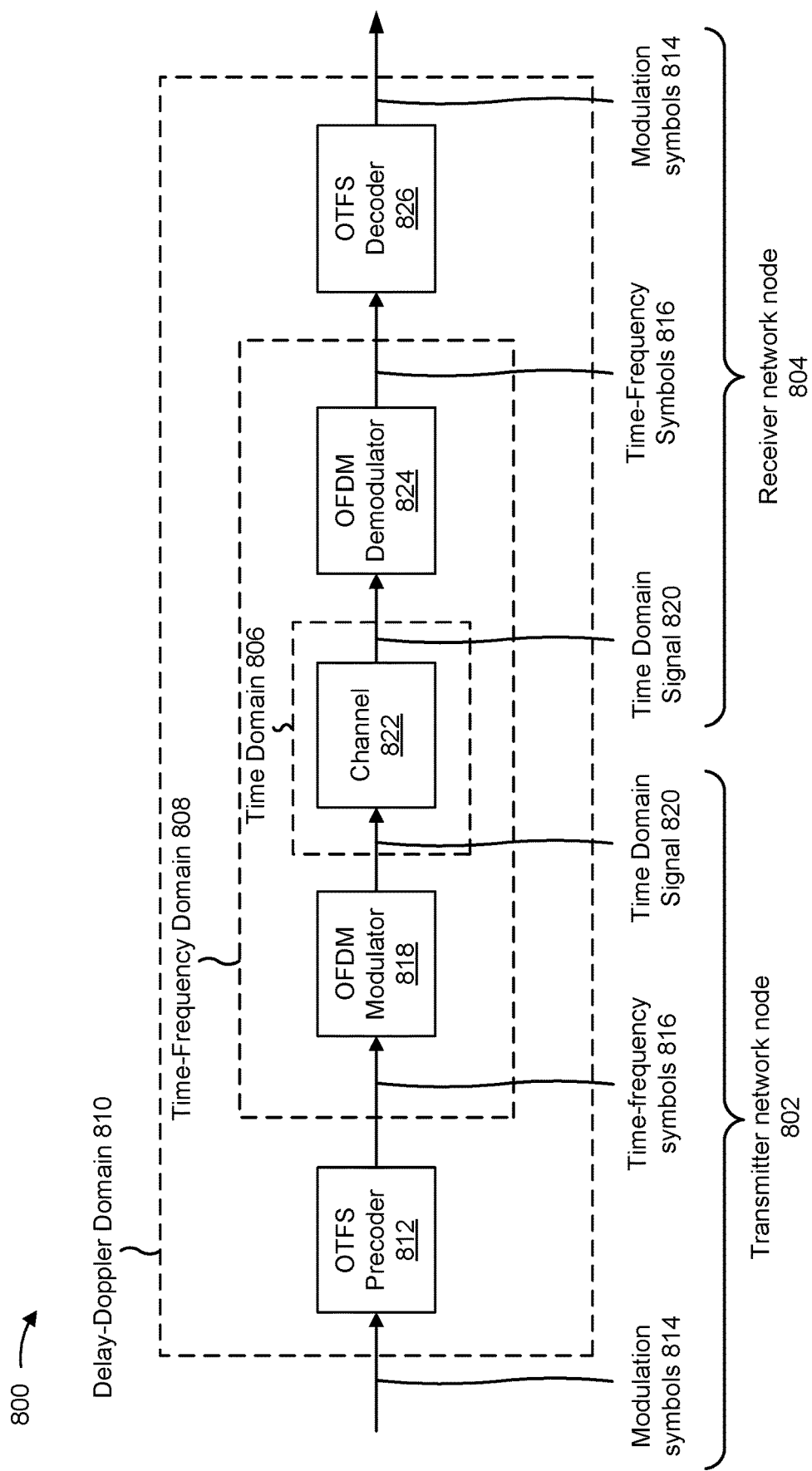
FIGS. 8A and 8B are diagrams illustrating examples associated with communication based on an orthogonal time frequency space (OTFS) waveform, in accordance with the present disclosure.
Figure 8B:
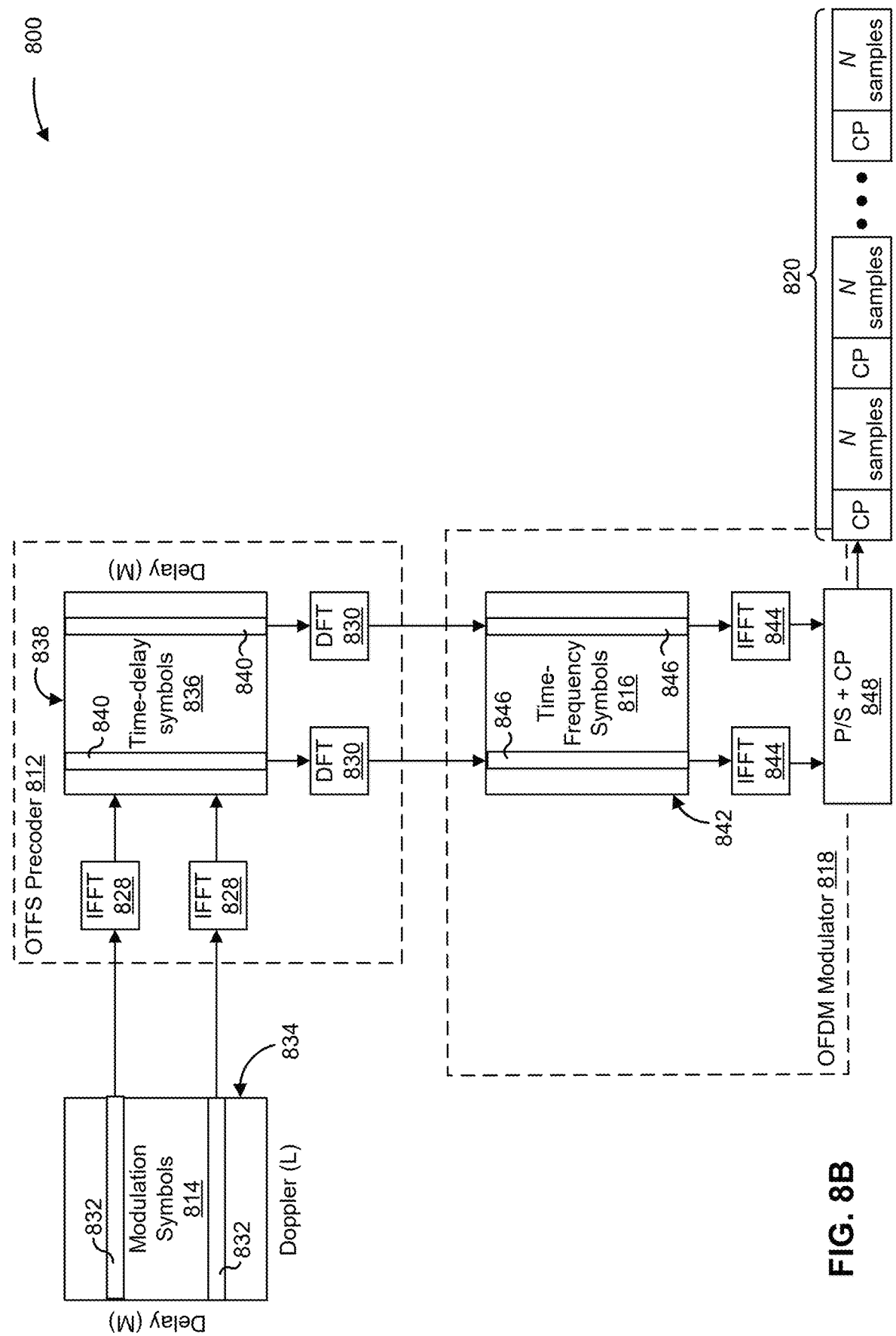

FIGS. 8A and 8B are diagrams illustrating examples 800 associated with communication based on an orthogonal time frequency space (OTFS) waveform, in accordance with the present disclosure.

In a wireless network, such as an NR network, wireless communication may be based on orthogonal frequency division multiplexing (OFDM) modulation and demodulation. For example, in OFDM, multiple closely spaced orthogonal subcarrier signals with overlapping spectra are transmitted to carry data in parallel, demodulation is based on FFT algorithms, and a guard interval precedes the beginning of each symbol to improve orthogonality in transmission channels that may be affected by multipath propagation. In OFDM techniques, each subcarrier (or signal) is modulated using a modulation scheme (e.g., quadrature amplitude modulated (QAM) or phase-shift keying) at a low symbol rate, which maintains total data rates at a level similar to single-carrier modulation schemes in the same bandwidth. Accordingly, relative to single-carrier schemes, OFDM techniques may tolerate severe channel conditions (e.g., attenuation of high frequencies, narrowband interference, and/or frequency-selective fading due to multipath) without requiring complex equalization filters. The low symbol rate enables the use of a guard interval between symbols to eliminate inter-symbol interference (ISI) and use echoes and time-spreading to achieve a diversity gain (e.g., a signal-to-noise ratio (SNR) improvement). This mechanism also facilitates a single frequency network (SFN) where several adjacent transmitters send the same signal simultaneously at the same frequency, as the signals from multiple distant transmitters may be constructively recombined at the receiver.

In some cases, however, OFDM modulation and demodulation of wireless communications may be susceptible to high residual frequency offset and/or large Doppler spread. These issues can occur, for example, in high-Doppler environments such as high-speed train (HST) or high-speed rail (HSR) communications, V2X communications, high-speed vehicle communications, and/or other high-mobility communication environments in which channel conditions in a wireless network rapidly change. Frequency offset and/or large Doppler spread may result in inter-carrier interference (ICI) (e.g., power leakage among sub-carriers) for wireless communications that use OFDM modulation and demodulation. A wireless channel may function as a linear time-variant channel in a high-mobility communication environment, as opposed to a linear time-invariant channel that is assumed for OFDM modulation and demodulation. As a result, frequency dispersion and/or time dispersion in a high-mobility communication environment, resulting from high residual frequency offset and/or large Doppler spread, can result in a breakdown in orthogonality in OFDM modulation and demodulation, which causes increased ICI. Increased ICI may result in decreased channel estimation accuracy, which may cause a decrease in robustness of communications, an increase in dropped or undecodable communications, and/or an increase in retransmissions, among other examples. An increase in retransmissions may result in increased consumption of processing, memory, and/or radio resources for UEs, base stations, TRPs, CUs, DUs, RUs, and/or other nodes in a wireless network.

In some cases, OTFS precoding and OTFS decoding may be used to mitigate and/or reduce the effects of high residual frequency offset and/or large Doppler shift that can occur for wireless communications in high-mobility communication environments. In some cases, a first network node that is transmitting a signal to a second network node may apply an OTFS precoding to resource samples that are allocated in a delay-Doppler domain (e.g., using an OTFS precoder). In particular, the first network node, which may be referred to herein as a transmitter node, may apply the OTFS precoding to the resource samples that are allocated in the delay-Doppler domain to transform the resource samples from the delay-Doppler domain to symbols in a time-frequency domain. The transmitter node may modulate the symbols using OFDM to further transform the symbols from the time-frequency domain to the time domain for transmission over a wireless channel. The second network node, which may be referred to herein as a receiver node, may receive the symbols and may perform reverse operations to demodulate and decode the transmission (e.g., using an OTFS decoder).

OTFS precoding and decoding of transmissions over a wireless channel may provide constant fading and multipath diversity, as well as sparse and stable channel occupation, which enables joint time-frequency diversity for the transmissions. OTFS precoding and decoding may also enable a reduced peak-to-average power ratio (PAPR), greater power transmission efficiency, and/or reduced cyclic prefix overhead, among other examples. This may decrease ICI for transmissions in high-mobility communication environments. In this way, robustness of communications may be increased, dropped or undecodable communications may be decreased, and/or retransmissions may be decreased, among other examples.

More particularly, as shown in FIG. 8A, communication between a transmitter network node 802 and a receiver network node 804 may be performed in a time domain 806. A signal to be transmitted by the transmitter network node to the receiver network node may be converted or transformed to the time domain 806 from one or more other domains, such as a time-frequency domain 808 and a delay-Doppler domain 810. The signal transmitted from the transmitter network node 802 to the receiver network node 804 may be an uplink communication (e.g., a sounding reference signal (SRS) transmission, a physical uplink control channel (PUCCH) communication, or a physical uplink shared channel (PUSCH) communication), a downlink communication (e.g., a tracking reference signal (TRS) transmission, a physical downlink control channel (PDCCH) communication, or a physical downlink shared channel (PDSCH) communication), a sidelink communication (e.g., a physical sidelink control channel (PSCCH) communication, or a physical sidelink shared channel (PSSCH) communication), or another type of communication.

As further shown in FIG. 8A, the transmitter network node 802 may include an OTFS precoder 812, which may receive modulation symbols 814 which may be received as a modulation symbol matrix. The modulation symbols 814 may include a plurality (M×L) of modulation symbols (e.g., delay-Doppler symbols or resource samples) of the communication and convert the modulation symbols from the delay-Doppler domain 810 to the time-frequency domain 808. In particular, the OTFS precoder 812 may convert or transform the modulation symbols 814 to time-frequency symbols 816, which may be included in a time-frequency symbol matrix. The modulation symbols 814 may include a block of M×L delay-Doppler QAM symbols that are discretized to an M×L delay-Doppler plane that includes M delay samples and L Doppler shift samples. The time-frequency symbols 816 may include a block of M×L OFDM modulated symbols that are spread across M subcarriers and L time symbols.

As further shown in FIG. 8A, the transmitter network node 802 may include an OFDM modulator 818. The OFDM modulator 818 may convert or transform the time-frequency symbols 816 from the time-frequency domain 808 to the time domain 806. In particular, the OFDM modulator 818 may modulate the time-frequency symbols 816 using an OFDM technique to generate a time domain signal 820 that includes the information of the signal to be transmitted to the receiver network node 804. The time domain signal 820 includes a time-varying signal that includes L symbols, each including M samples. The transmitter network node 802 may transmit the time domain signal 820 over a channel 822 (e.g., a wireless channel).

The receiver network node 804 receives the time domain signal 820 over the channel 822 from the transmitter network node 802. The receiver network node 804 may include an OFDM demodulator 824 that converts or transforms the time domain signal 820 from the time domain 806 to the time-frequency domain 808. In particular, the OFDM demodulator 824 demodulates the time domain signal 820 using an OFDM technique to convert or transform the time domain signal 820 to the time-frequency symbols 816. The receiver network node 804 further includes an OTFS decoder 826. The OTFS decoder 826 may convert or transform the time-frequency symbols 816 from the time-frequency domain 808 to the delay-Doppler domain 810. In particular, the OTFS decoder 826 may decode the time-frequency symbols 816 to obtain the modulation symbols 814.

As shown in FIG. 8B, the OTFS precoder 812 may apply or use a two-dimensional (2D) DFT component to convert the modulation symbols 814 to the time-frequency symbols 816. However, other 2D transforms may be used for OTFS precoding to transform or convert the modulation symbols 814 to the time-delay symbols 836.

The 2D DFT component may include an inverse symplectic FFT (ISFFT), which can be a transform that includes an inverse FFT (IFFT) 828 and a DFT 830, where the IFFT 828 is applied in one dimension of a delay-Doppler matrix and the DFT 830 is applied in a second dimension of the delay-Doppler matrix. The OTFS precoder 812 uses the IFFT 828 on the M delay samples of the modulation symbols 814 and uses the DFT 830 on the L Doppler samples of the modulation symbols 814 to generate the time-frequency symbols 816. For example, the OTFS precoder 812 may apply an IFFT 828 to each column 832 of the modulation symbol matrix 834 to convert the modulation symbols 814 to time-delay symbols 836, which may be included in a time-delay symbol matrix 838. The DFT 830 may be applied to each column 840 of the time-delay symbol matrix 838 to generate the time-frequency symbols 816, which may be included in a time-frequency matrix 842.

The time-frequency symbols 816 are provided to the OFDM modulator 818. The OFDM modulator 818 includes an IFFT 844 that is used to modulate the time-frequency symbols 816 by oversampling the time-frequency symbols 816 to generate the time domain signal 820, which includes L time domain symbols, each having N samples. For example, the IFFT 844 may be applied to each column 846 of the time-frequency matrix 842 to generate time domain columns and a P/S converter and CP appending component (shown as P/S+CP) 848 may be used to convert the time domain columns into the L symbols of the time domain signal 820, each symbol having a CP and L samples). Note that while the example in FIG. 8B illustrates that the M delay samples of the modulation symbols 814 are mapped first and the L Doppler samples of the modulation symbols 814 are mapped second, the L Doppler samples of the modulation symbols 814 may be mapped first and the M delay samples of the modulation symbols 814 may be mapped second. The order has little to no effect on the OTFS precoding performance due to the joint detection in OTFS and constant delay-Doppler channel throughout OTFS. The mapping order can be configured by a network node, can be defined in a wireless communication standard or specification (e.g., a 3GPP specification), and/or negotiated among network nodes, among other examples.

The OFDM demodulator 824 and the OTFS decoder 826 of the receiver network node 804 may perform reverse operations of those shown in FIG. 8B to demodulate and decode the communication. However, the OTFS decoder 826 uses a symplectic FFT (SFFT) (instead of an ISFFT) to convert the time-frequency symbols 816 to the modulation symbols 814. The SFFT includes a 2D transform similar to the ISFFT, but a non-inverse version. In some aspects, the OTFS decoder 826 uses another type of 2D transform to convert the time-frequency symbols 816 to the modulation symbols 814.

While the CP-based OTFS waveform can be used to facilitate communication in high Doppler scenarios, some inter-symbol interference can still occur. For example, interference from CPs to adjacent data samples can occur from use of the CP-based OTFS waveform.

Some techniques and apparatuses described herein may provide a GI-based OTFS waveform. For example, in some aspects, a transmitter network node may generate a GI-based OFTS waveform including at least one defined sequence associated with at least one GI in a time domain corresponding to the GI-based OTFS waveform. In some aspects, the at least one defined sequence includes at least one of a head sequence or a tail sequence. In some aspects, the at least one defined sequence may include a set of zero samples. In some aspects, the at least one defined sequence may include a set of unique word samples. In some aspects, at least one set of zero samples may be appended pre-DFT and at least one set of unique word samples may be appended post-DFT. In this way, some aspects may provide a GI-based OTFS waveform, thereby facilitating more robust signaling in high Doppler scenarios while mitigating inter-symbol interference.

As indicated above, FIGS. 8A and 8B are provided as examples. Other examples may differ from what is described with respect to FIGS. 8A and 8B.

Figure 9:
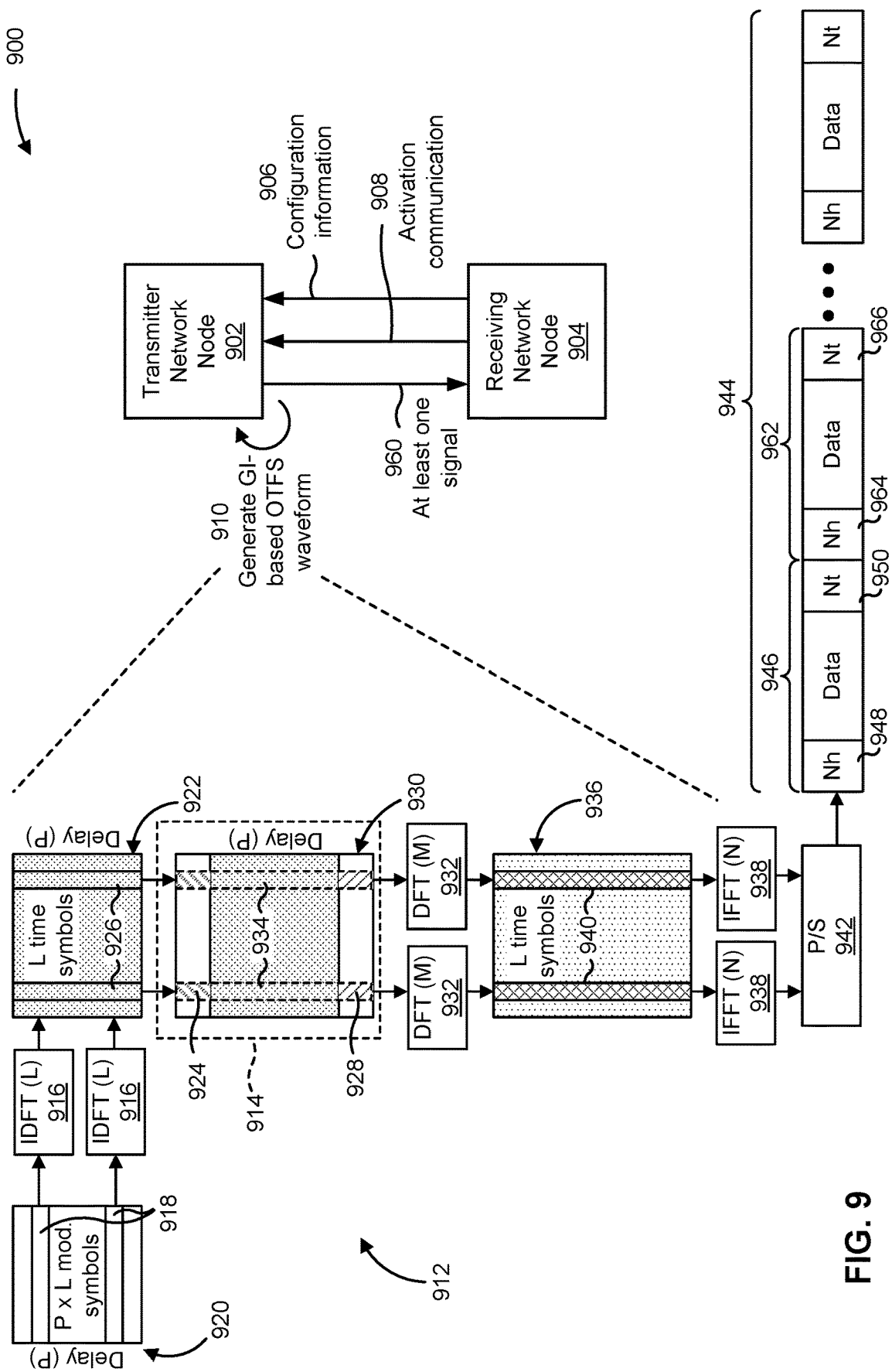
FIG. 9 is a diagram illustrating an example associated with GI-based OTFS waveforms, in accordance with the present disclosure.

FIG. 9 is a diagram illustrating an example 900 associated with GI-based OTFS waveforms, in accordance with the present disclosure. As shown, a transmitter network node 902 may communicate with a receiver network node 904. In some aspects, the transmitter network node 902 and/or the receiver network node 904 may be, be similar to, include, or be included in, the transmitter network node 802 depicted in FIGS. 8A and 8B, the network node 110 depicted in FIGS. 1 and 2, and/or one or more components of the disaggregated base station architecture 300 depicted in FIG. 3, among other examples.

As shown by reference number 906, the receiver network node 904 may transmit, and/or the transmitter network node 902 may receive, configuration information. In some aspects, the configuration information may be transmitted using an RRC communication. The configuration information may be associated with a GI-based OTFS waveform and may, for example, configure the transmitter network node 902 to transmit signals using a GI-based OTFS waveform. As shown by reference number 908, the receiver network node 904 may transmit, and/or the transmitter network node 902 may receive, an activation communication. In some aspects, the activation communication may include a medium access control control element (MAC CE) and/or downlink control information (DCI), among other examples. The activation communication may trigger the transmitter network node 902 to transmit at least one signal based on a GI-based OTFS waveform.

As shown by reference number 910, the transmitter network node 902 may generate a GI-based OTFS waveform. The GI-based OTFS waveform may include at least one defined sequence associated with at least one GI in a time domain corresponding to the GI-based OTFS waveform. In some aspects, the at least one defined sequence may include at least one of a head sequence or a tail sequence. In some aspects, the at least one defined sequence may include at least one set of zero samples and/or at least one set of unique word samples.

The transmitter network node 902 may generate the GI-based OTFS waveform by appending the set of tail samples and/or the set of head samples to pre-DFT samples and/or post-DFT samples. In some aspects, the transmitter network node 902 may generate the GI-based OTFS waveform based on appending at least one of a set of tail samples or a set of head samples to a set of data samples to generate a modified set of data samples. The modified set of data samples may be provided to a DFT component to generate the GI-based OTFS waveform. In some aspects, generating the GI-based OTFS waveform may include providing a first set of data samples to a DFT component and generating a first transformed set of data samples using the DFT component. A second transformed set of data samples may be generated using an IFFT component and a set of tail samples and/or head samples may be appended to the second transformed set of data samples.

FIG. 9 illustrates an example procedure for generating the GI-based OTFS waveform, in accordance with the present disclosure. As shown, for example, a defined sequence component 914 of the transmitter network node 902 may apply an inverse DFT (IDFT) (shown as "IDFT (L)") 916 to each column 918 of a modulation symbol matrix 920 to sample each column 918 M times to generate a time-delay symbol matrix 922 having L time symbols. The transmitter network node 902 may append a set 924 of head samples to each column 926 of the time-delay symbol matrix 922 and a set 928 of tail samples to each column 926 of the time-delay symbol matrix 922 to generate a modified symbol matrix 930. The set 924 of head samples and/or the set 928 of tail symbols may include zero samples and/or unique word (UW) samples.

The transmitter network node 902 may apply a DFT (shown as "DFT (M)") 932 to each column 934 of the modified symbol matrix 930 to generate a first transformed symbol matrix 936. The transmitter network node 902 may apply an IFFT (shown as "IFFT (N)") 938 to each column 940 of the first transformed symbol matrix 936 to generate a second modified symbol matrix, which may be serialized by a P/S component 942 to generate a time domain signal 944. For example, the IFFT (N) 938 may oversample the first transformed symbol matrix 936 to generate N samples for each of L time symbols. Each symbol 946 of the time domain signal 944 may include N samples. The N samples may, as shown, include data samples between a header GI 948 and a tail GI 950. In some aspects, the header GI 948 may include Nh head samples and the tail GI 950 may include Nt tail samples. In some aspects, a quantity of samples in the at least one of the set 928 of tail samples or the set 924 of head samples may be based on a ceiling function associated with a quantity of samples in the GI-based OTFS waveform: Mt=ceiling(Nt×M/N) and/or Mh=ceiling(Nh×M/N).

The Nh head samples may be zero samples and/or UW samples and the Nt tail samples may be zero samples and/or UW samples. In some aspects, the UW samples may include any UW sequence. In some aspects, different UWs may be used for different estimation procedures. For example, a first UW may be used for a first channel estimation procedure and a second UW may be used for a second channel estimation procedure. In some aspects, the transmitter network node 902 may generate the GI-based OTFS waveform by appending zero head samples and zero tail samples pre-DFT and then appending UW head samples and UW tail samples to the serialized samples.

As shown by reference number 960, the transmitter network node 902 may transmit, and the receiver network node 904 may receive, at least one signal (e.g., the signal 944) based on the GI-based OTFS waveform. In some aspects, the signal 944 may include a first symbol 946 having at least one of a zero header 948 or a zero tail 950 and a second symbol 962 having at least one of a UW header 964 or a UW tail 966. The signal 944 may include any number of symbols having zero headers and/or tails and/or symbols 962 having UW headers and/or tails. In such aspects, the circular convolution property may not be satisfied for a transition symbol. To maintain the circular convolution property, in some aspects, a gap symbol and/or a tail-only symbol may be used as a transition symbol.

As indicated above, FIG. 9 is provided as an example. Other examples may differ from what is described with respect to FIG. 9.

Figure 10A:
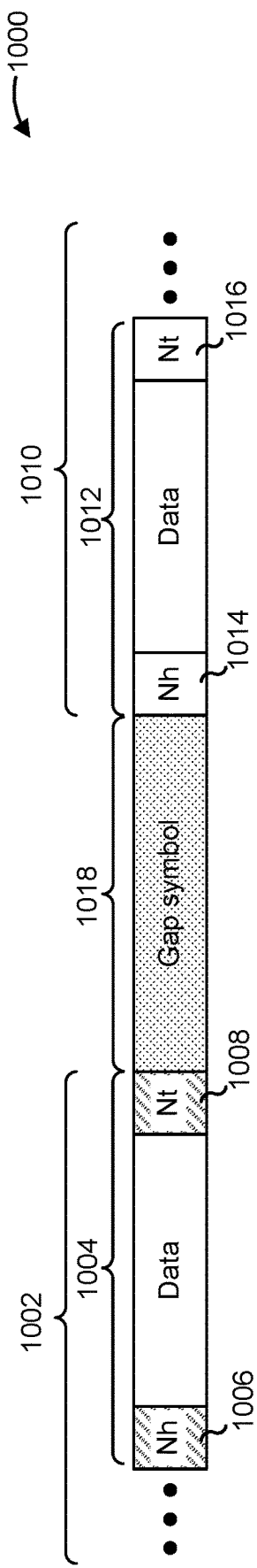
FIG. 10A illustrates an example associated with GI-based OTFS waveforms, in accordance with the present disclosure.

FIG. 10A illustrates an example 1000 associated with GI-based OTFS waveforms, in accordance with the present disclosure. As shown, a first time domain signal 1002 may include L time domain GI-based OTFS waveform symbols 1004 having UW headers 1006 and UW tails 1008. A second time domain signal 1010 may include L time domain GI-based OTFS waveform symbols 1012 having zero headers 1014 and zero tails 1016. To maintain the circular convolution property, a gap symbol 1018 may be inserted between the first time domain signal 1002 and the second time domain signal 1010. In some aspects, the gap symbol may include a GI-OFDM signal or a GI-DFT-s-OFDM signal.

Figure 10B:
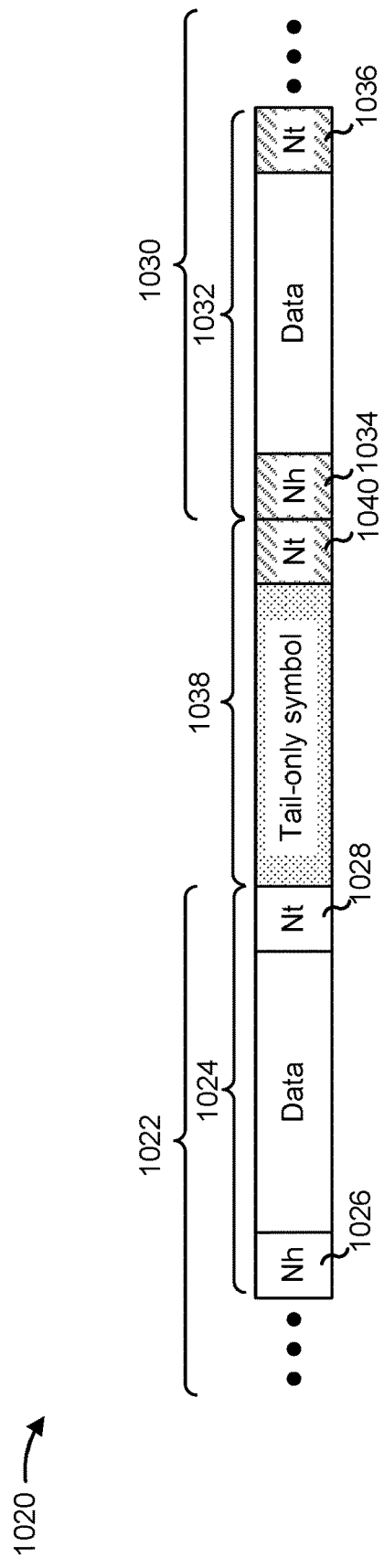
FIG. 10B illustrates an example associated with GI-based OTFS waveforms, in accordance with the present disclosure.

FIG. 10B illustrates an example 1020 associated with GI-based OTFS waveforms, in accordance with the present disclosure. As shown, a first time domain signal 1022 may include L time domain GI-based OTFS waveform symbols 1024 having zero headers 1026 and zero tails 1028. A second time domain signal 1030 may include L time domain GI-based OTFS waveform symbols 1032 having UW headers 1034 and UW tails 1036. To maintain the circular convolution property, a tail-only symbol 1038 may be inserted between the first time domain signal 1022 and the second time domain signal 1030. In some aspects, the tail-only symbol may include a GI-OFDM signal or a GI-DFT-s-OFDM signal having a UW tail 1040 (but no header).

As indicated above, FIGS. 10A and 10B are provided as examples. Other examples may differ from what is described with respect to FIGS. 10A and 10B.

FIG. 11 is a diagram illustrating an example process 1100 performed, for example, by a transmitter network node, in accordance with the present disclosure. Example process 1100 is an example where the transmitter network node (e.g., transmitter network node 902) performs operations associated with GI-based OTFS waveforms.

As shown in FIG. 11, in some aspects, process 1100 may include generating a GI-based OTFS waveform comprising at least one defined sequence associated with at least one GI in a time domain corresponding to the GI-based OTFS waveform (block 1110). For example, the transmitter network node (e.g., using communication manager 1308 and/or generation component 1310, depicted in FIG. 13) may generate a GI-based OTFS waveform comprising at least one defined sequence associated with at least one GI in a time domain corresponding to the GI-based OTFS waveform, as described above.

As further shown in FIG. 11, in some aspects, process 1100 may include transmitting at least one signal based on the GI-based OTFS waveform (block 1120). For example, the transmitter network node (e.g., using communication manager 1308 and/or transmission component 1304, depicted in FIG. 13) may transmit at least one signal based on the GI-based OTFS waveform, as described above.

Process 1100 may include additional aspects, such as any single aspect or any combination of aspects described below and/or in connection with one or more other processes described elsewhere herein.

In a first aspect, the at least one defined sequence comprises at least one of a head sequence or a tail sequence. In a second aspect, alone or in combination with the first aspect, the at least one defined sequence comprises at least one set of zero samples. In a third aspect, alone or in combination with one or more of the first and second aspects, the at least one defined sequence comprises at least one set of unique word samples.

In a fourth aspect, alone or in combination with one or more of the first through third aspects, generating the GI-based OTFS waveform comprises appending at least one of a set of tail samples or a set of head samples to a set of data samples to generate a modified set of data samples, and providing the modified set of data samples to a DFT component. In a fifth aspect, alone or in combination with one or more of the first through fourth aspects, a quantity of samples in the at least one of the set of tail samples or the set of head samples is based on a ceiling function associated with a quantity of samples in the GI-based OTFS waveform. In a sixth aspect, alone or in combination with one or more of the first through fifth aspects, generating the GI-based OTFS waveform comprises providing a first set of data samples to a DFT component, generating a first transformed set of data samples using the DFT component, generating a second transformed set of data samples using an IFFT component, and appending a set of tail samples to the second transformed set of data samples. In a seventh aspect, alone or in combination with one or more of the first through sixth aspects, generating the GI-based OTFS waveform comprises appending at least one of a set of zero tail samples or a set of zero head samples to a set of data samples to generate a modified set of data samples, providing the modified set of data samples to a DFT component, generating a first transformed set of data samples using the DFT component, generating a second transformed set of data samples using an IFFT component, and appending a set of unique word tail samples to the second transformed set of data samples.

In an eighth aspect, alone or in combination with one or more of the first through seventh aspects, process 1100 includes receiving configuration information associated with the GI-based OTFS waveform, wherein generating the GI-based OTFS waveform comprises generating the GI-based OTFS waveform based on the configuration information. In a ninth aspect, alone or in combination with one or more of the first through eighth aspects, receiving the configuration information comprises receiving an RRC communication including the configuration information. In a tenth aspect, alone or in combination with one or more of the first through ninth aspects, process 1100 includes receiving an activation communication, wherein generating the GI-based OTFS waveform comprises generating the GI-based OTFS waveform based on the activation communication. In an eleventh aspect, alone or in combination with one or more of the first through tenth aspects, the activation communication comprises at least one of a MAC CE or DCI.

In a twelfth aspect, alone or in combination with one or more of the first through eleventh aspects, transmitting the at least one signal comprises transmitting a plurality of signals comprising a first symbol comprising the GI-based OTFS waveform, the GI-based OTFS waveform comprising at least one of a zero header or a zero tail, and a second symbol comprising an additional GI-based OTFS waveform, the additional GI-based OTFS waveform comprising at least one of a unique word header or a unique word tail. In a thirteenth aspect, alone or in combination with one or more of the first through twelfth aspects, the first symbol is transmitted before the second symbol, and transmitting the at least one signal comprises transmitting a gap symbol between the first symbol and the second symbol. In a fourteenth aspect, alone or in combination with one or more of the first through thirteenth aspects, the gap symbol comprises at least one of a GI-based OFDM signal or a GI-based discrete Fourier transform spread OFDM signal. In a fifteenth aspect, alone or in combination with one or more of the first through fourteenth aspects, the first symbol is transmitted after the second symbol, and transmitting the at least one signal comprises transmitting a tail-only symbol between the second symbol and the first symbol. In a sixteenth aspect, alone or in combination with one or more of the first through fifteenth aspects, the tail-only symbol comprises at least one of a tail-only GI-based OFDM signal or a tail-only GI-based discrete Fourier transform spread OFDM signal.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
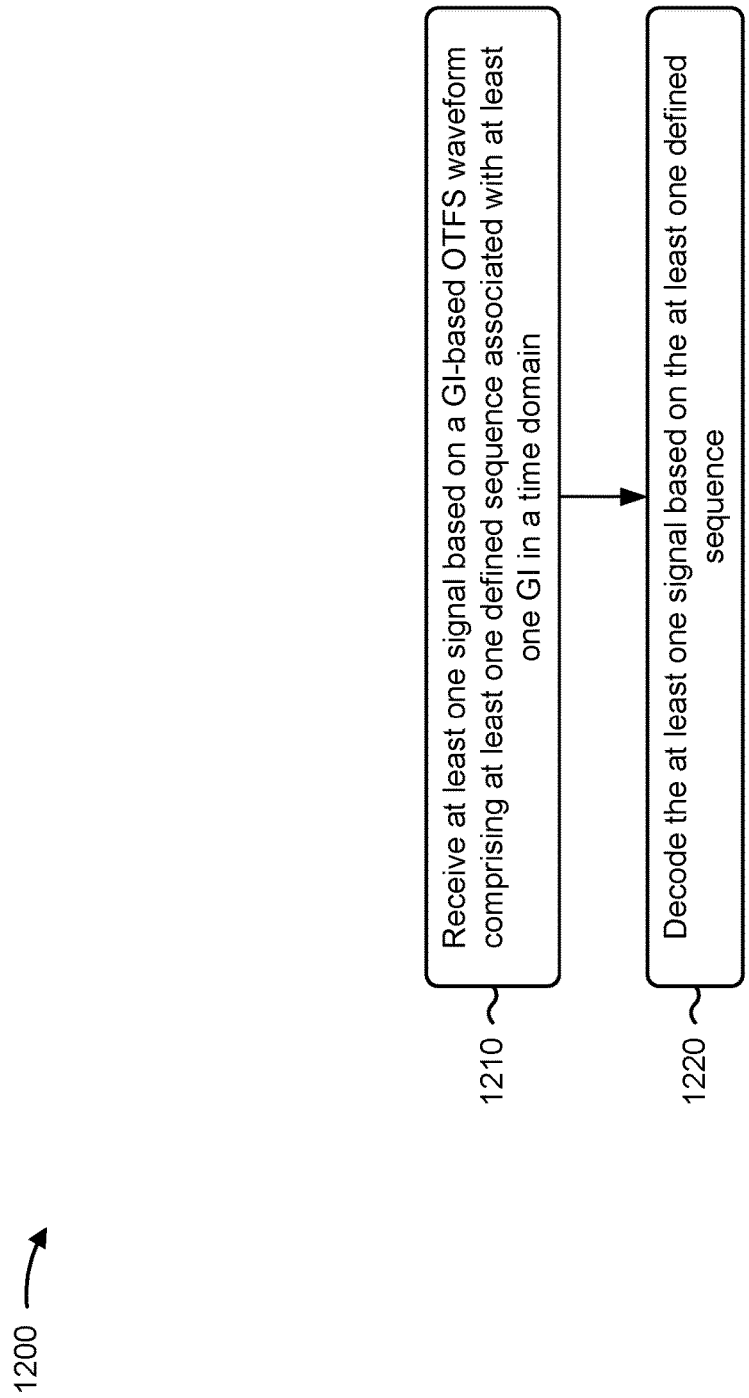
FIG. 12 is a diagram illustrating an example process performed, for example, by a receiver network node, in accordance with the present disclosure.

FIG. 12 is a diagram illustrating an example process 1200 performed, for example, by a receiver network node, in accordance with the present disclosure. Example process 1200 is an example where the receiver network node (e.g., receiver network node 110) performs operations associated with GI-based OTFS waveforms.

As shown in FIG. 12, in some aspects, process 1200 may include receiving at least one signal based on a GI-based OTFS waveform comprising at least one defined sequence associated with at least one GI in a time domain (block 1210). For example, the receiver network node (e.g., using communication manager 1308 and/or reception component 1302, depicted in FIG. 13) may receive at least one signal based on a GI-based OTFS waveform comprising at least one defined sequence associated with at least one GI in a time domain, as described above.

As further shown in FIG. 12, in some aspects, process 1200 may include decoding the at least one signal based on the at least one defined sequence (block 1220). For example, the receiver network node (e.g., using communication manager 1308 and/or reception component 1302, depicted in FIG. 13) may decode the at least one signal based on the at least one defined sequence, as described above.

Process 1200 may include additional aspects, such as any single aspect or any combination of aspects described below and/or in connection with one or more other processes described elsewhere herein.

In a first aspect, the at least one defined sequence comprises at least one of a head sequence or a tail sequence. In a second aspect, alone or in combination with the first aspect, the at least one defined sequence comprises at least one set of zero samples. In a third aspect, alone or in combination with one or more of the first and second aspects, the at least one defined sequence comprises at least one set of unique word samples.

In a fourth aspect, alone or in combination with one or more of the first through third aspects, process 1200 includes transmitting configuration information associated with the GI-based OTFS waveform, wherein the GI-based OTFS waveform is based on the configuration information. In a fifth aspect, alone or in combination with one or more of the first through fourth aspects, transmitting the configuration information comprises transmitting an RRC communication including the configuration information. In a sixth aspect, alone or in combination with one or more of the first through fifth aspects, process 1200 includes transmitting an activation communication, wherein the GI-based OTFS waveform is based on the activation communication. In a seventh aspect, alone or in combination with one or more of the first through sixth aspects, the activation communication comprises at least one of a MAC CE or DCI.

In an eighth aspect, alone or in combination with one or more of the first through seventh aspects, receiving the at least one signal comprises receiving a plurality of signals comprising a first symbol comprising the GI-based OTFS waveform, the GI-based OTFS waveform comprising at least one of a zero header or a zero tail, and a second symbol comprising an additional GI-based OTFS waveform, the additional GI-based OTFS waveform comprising at least one of a unique word header or a unique word tail. In a ninth aspect, alone or in combination with one or more of the first through eighth aspects, the first symbol is received before the second symbol, and receiving the at least one signal comprises receiving a gap symbol between the first symbol and the second symbol. In a tenth aspect, alone or in combination with one or more of the first through ninth aspects, the gap symbol comprises at least one of a GI-based OFDM signal or a GI-based discrete Fourier transform spread OFDM signal. In an eleventh aspect, alone or in combination with one or more of the first through tenth aspects, the first symbol is received after the second symbol, and receiving the at least one signal comprises receiving a tail-only symbol between the second symbol and the first symbol. In a twelfth aspect, alone or in combination with one or more of the first through eleventh aspects, the tail-only symbol comprises at least one of a tail-only GI-based OFDM signal or a tail-only GI-based discrete Fourier transform spread OFDM signal.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
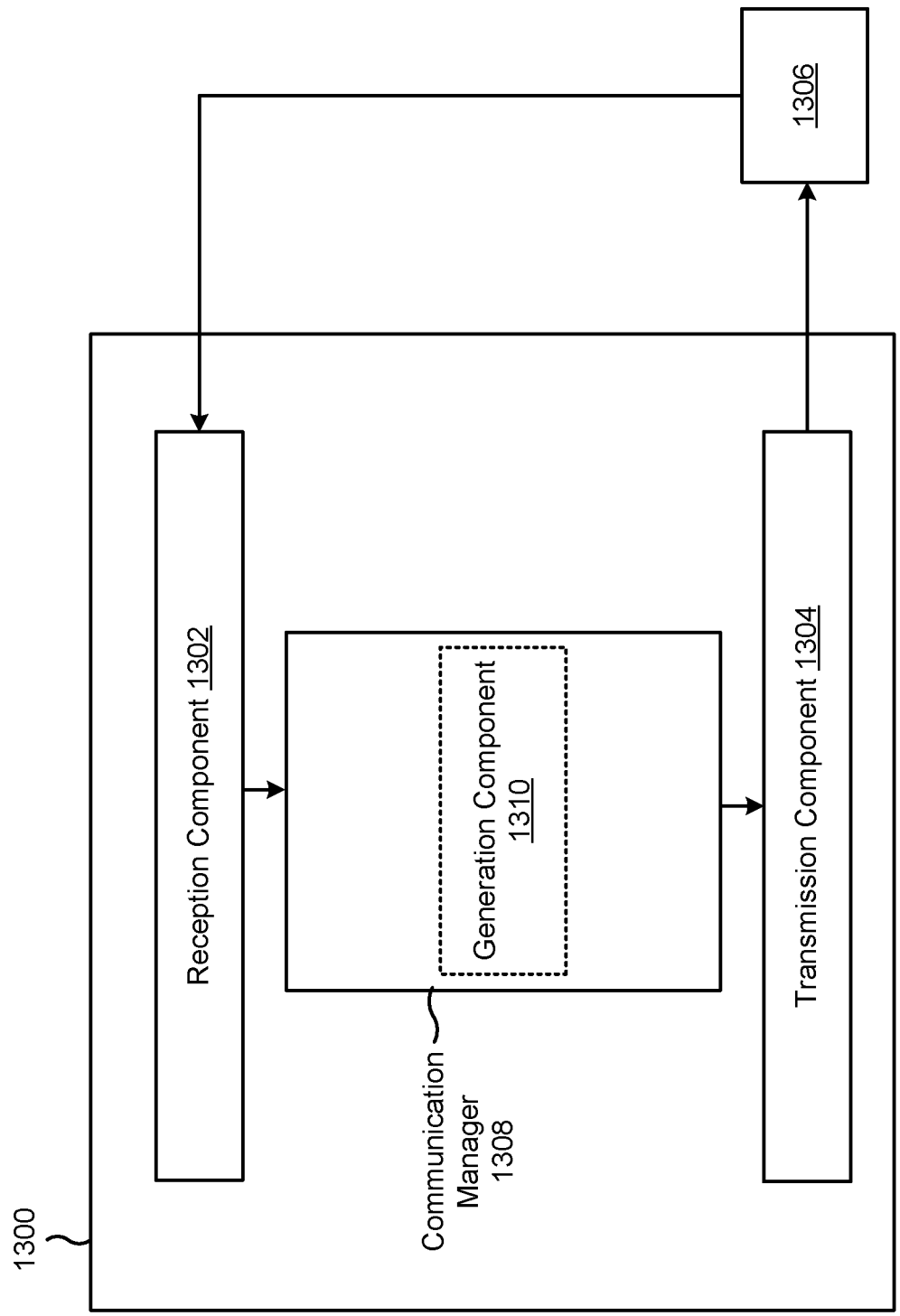
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a network node, or a network node may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a communication manager 1308. The communication manager 1308 may include a generation component 1310, among other examples.

In some aspects, the apparatus 1300 may be configured to perform one or more operations described herein in connection with FIGS. 9 and 10. Additionally, or alternatively, the apparatus 1300 may be configured to perform one or more processes described herein, such as process 1100 of FIG. 11, process 1200 of FIG. 12, or a combination thereof. In some aspects, the apparatus 1300 and/or one or more components shown in FIG. 13 may include one or more components of the network node and/or UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network node and/or UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the network node and/or UE described in connection with FIG. 2. In some aspects, the transmission component 1304 may be co-located with the reception component 1302 in a transceiver.

In some examples, means for transmitting, outputting, or sending (or means for outputting for transmission) may include one or more antennas, a modulator, a transmit MIMO processor, a transmit processor, or a combination thereof, of the network node and/or the UE described above in connection with FIG. 2.

In some examples, means for receiving (or means for obtaining) may include one or more antennas, a demodulator, a MIMO detector, a receive processor, or a combination thereof, of the network node and/or the UE described above in connection with FIG. 2.

In some cases, rather than actually transmitting, for example, signals and/or data, a device may have an interface to output signals and/or data for transmission (a means for outputting). For example, a processor may output signals and/or data, via a bus interface, to an RF front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for receiving, transmitting, decoding, appending, providing, and/or generating, may include various processing system components, such as a receive processor, a transmit processor, a controller/processor, a memory, or a combination thereof, of the network node and/or the UE described above in connection with FIG. 2.

The communication manager 1308 and/or the generation component 1310 may generate a GI-based OTFS waveform comprising at least one defined sequence associated with at least one GI in a time domain corresponding to the GI-based OTFS waveform. In some aspects, the communication manager 1308 may include one or more antennas, a modem, a controller/processor, a memory, or a combination thereof, of the network node and/or the UE described in connection with FIG. 2. In some aspects, the communication manager 1308 may include the reception component 1302 and/or the transmission component 1304. In some aspects, the communication manager 1308 may be, be similar to, include, or be included in, the communication manager 140 and/or the communication manager 150 depicted in FIGS. 1 and 2. In some aspects, the generation component 1310 may include one or more antennas, a modem, a controller/processor, a memory, or a combination thereof, of the network node and/or the UE described in connection with FIG. 2. In some aspects, the generation component 1310 may include the reception component 1302 and/or the transmission component 1304.

The communication manager 1308 and/or the transmission component 1304 may transmit at least one signal based on the GI-based OTFS waveform. The communication manager 1308 and/or the reception component 1302 may receive configuration information associated with the GI-based OTFS waveform, wherein generating the GI-based OTFS waveform comprises generating the GI-based OTFS waveform based on the configuration information. The communication manager 1308 and/or the reception component 1302 may receive an activation communication, wherein generating the GI-based OTFS waveform comprises generating the GI-based OTFS waveform based on the activation communication.

The communication manager 1308 and/or the reception component 1302 may receive at least one signal based on a GI-based OTFS waveform comprising at least one defined sequence associated with at least one GI in a time domain. The communication manager 1308 and/or the reception component 1302 may decode the at least one signal based on the at least one defined sequence. The communication manager 1308 and/or the transmission component 1304 may transmit configuration information associated with the GI-based OTFS waveform, wherein the GI-based OTFS waveform is based on the configuration information. The communication manager 1308 and/or the transmission component 1304 may transmit an activation communication, wherein the GI-based OTFS waveform is based on the activation communication.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a transmitter network node, comprising: generating a guard interval (GI)-based orthogonal time frequency space (OTFS) waveform comprising at least one defined sequence associated with at least one GI in a time domain corresponding to the GI-based OTFS waveform; and transmitting at least one signal based on the GI-based OTFS waveform.

Aspect 2: The method of Aspect 1, wherein the at least one defined sequence comprises at least one of a head sequence or a tail sequence.

Aspect 3: The method of either of claims 1 or 2, wherein the at least one defined sequence comprises at least one set of zero samples.

Aspect 4: The method of any of Aspects 1-3, wherein the at least one defined sequence comprises at least one set of unique word samples.

Aspect 5: The method of any of Aspects 1-4, wherein generating the GI-based OTFS waveform comprises: appending at least one of a set of tail samples or a set of head samples to a set of data samples to generate a modified set of data samples; and providing the modified set of data samples to a discrete Fourier transform (DFT) component.

Aspect 6: The method of Aspect 5, wherein a quantity of samples in the at least one of the set of tail samples or the set of head samples is based on a ceiling function associated with a quantity of samples in the GI-based OTFS waveform.

Aspect 7: The method of any of Aspects 1-4, wherein generating the GI-based OTFS waveform comprises: providing a first set of data samples to a discrete Fourier transform (DFT) component; generating a first transformed set of data samples using the DFT component; generating a second transformed set of data samples using an inverse fast Fourier transform (IFFT) component; and appending a set of tail samples to the second transformed set of data samples.

Aspect 8: The method of any of Aspects 14, wherein generating the GI-based OTFS waveform comprises: appending at least one of a set of zero tail samples or a set of zero head samples to a set of data samples to generate a modified set of data samples; providing the modified set of data samples to a discrete Fourier transform (DFT) component; generating a first transformed set of data samples using the DFT component; generating a second transformed set of data samples using an inverse fast Fourier transform (IFFT) component; and appending a set of unique word tail samples to the second transformed set of data samples.

Aspect 9: The method of any of Aspects 1-8, further comprising receiving configuration information associated with the GI-based OTFS waveform, wherein generating the GI-based OTFS waveform comprises generating the GI-based OTFS waveform based on the configuration information.

Aspect 10: The method of Aspect 9, wherein receiving the configuration information comprises receiving a radio resource control communication including the configuration information.

Aspect 11: The method of any of Aspects 1-10, further comprising receiving an activation communication, wherein generating the GI-based OTFS waveform comprises generating the GI-based OTFS waveform based on the activation communication.

Aspect 12: The method of Aspect 11, wherein the activation communication comprises at least one of a medium access control control element (MAC CE) or downlink control information (DCI).

Aspect 13: The method of any of Aspects 1-12, wherein transmitting the at least one signal comprises transmitting a plurality of signals comprising: a first symbol comprising the GI-based OTFS waveform, the GI-based OTFS waveform comprising at least one of a zero header or a zero tail, and a second symbol comprising an additional GI-based OTFS waveform, the additional GI-based OTFS waveform comprising at least one of a unique word header or a unique word tail.

Aspect 14: The method of Aspect 13, wherein the first symbol is transmitted before the second symbol, and wherein transmitting the at least one signal comprises transmitting a gap symbol between the first symbol and the second symbol.

Aspect 15: The method of Aspect 14, wherein the gap symbol comprises at least one of a GI-based orthogonal frequency division multiplexing (OFDM) signal or a GI-based discrete Fourier transform spread OFDM signal.

Aspect 16: The method of any of Aspects 13-15, wherein the first symbol is transmitted after the second symbol, and wherein transmitting the at least one signal comprises transmitting a tail-only symbol between the second symbol and the first symbol.

Aspect 17: The method of Aspect 16, wherein the tail-only symbol comprises at least one of a tail-only GI-based orthogonal frequency division multiplexing (OFDM) signal or a tail-only GI-based discrete Fourier transform spread OFDM signal.

Aspect 18: A method of wireless communication performed by a receiver network node, comprising: receiving at least one signal based on a guard interval (GI)-based orthogonal time frequency space (OTFS) waveform comprising at least one defined sequence associated with at least one GI in a time domain; and decoding the at least one signal based on the at least one defined sequence.

Aspect 19: The method of Aspect 18, wherein the at least one defined sequence comprises at least one of a head sequence or a tail sequence.

Aspect 20: The method of either of claim 18 or 19, wherein the at least one defined sequence comprises at least one set of zero samples.

Aspect 21: The method of any of Aspects 18-20, wherein the at least one defined sequence comprises at least one set of unique word samples.

Aspect 22: The method of any of Aspects 18-21, further comprising transmitting configuration information associated with the GI-based OTFS waveform, wherein the GI-based OTFS waveform is based on the configuration information.

Aspect 23: The method of Aspect 22, wherein transmitting the configuration information comprises transmitting a radio resource control communication including the configuration information.

Aspect 24: The method of any of Aspects 18-23, further comprising transmitting an activation communication, wherein the GI-based OTFS waveform is based on the activation communication.

Aspect 25: The method of Aspect 24, wherein the activation communication comprises at least one of a medium access control control element (MAC CE) or downlink control information (DCI).

Aspect 26: The method of any of Aspects 18-25, wherein receiving the at least one signal comprises receiving a plurality of signals comprising: a first symbol comprising the GI-based OTFS waveform, the GI-based OTFS waveform comprising at least one of a zero header or a zero tail, and a second symbol comprising an additional GI-based OTFS waveform, the additional GI-based OTFS waveform comprising at least one of a unique word header or a unique word tail.

Aspect 27: The method of Aspect 26, wherein the first symbol is received before the second symbol, and wherein receiving the at least one signal comprises receiving a gap symbol between the first symbol and the second symbol.

Aspect 28: The method of Aspect 27, wherein the gap symbol comprises at least one of a GI-based orthogonal frequency division multiplexing (OFDM) signal or a GI-based discrete Fourier transform spread OFDM signal.

Aspect 29: The method of any of Aspects 26-28, wherein the first symbol is received after the second symbol, and wherein receiving the at least one signal comprises receiving a tail-only symbol between the second symbol and the first symbol.

Aspect 30: The method of Aspect 29, wherein the tail-only symbol comprises at least one of a tail-only GI-based orthogonal frequency division multiplexing (OFDM) signal or a tail-only GI-based discrete Fourier transform spread OFDM signal.

Aspect 31: An apparatus for wireless communication at a device, comprising a processor, memory coupled with the processor, and instructions stored in the memory and executable by the processor to cause the apparatus to perform the method of one or more of Aspects 1-17.

Aspect 32: A device for wireless communication, comprising a memory and one or more processors coupled to the memory, the one or more processors configured to perform the method of one or more of Aspects 1-17.

Aspect 33: An apparatus for wireless communication, comprising at least one means for performing the method of one or more of Aspects 1-17.

Aspect 34: A non-transitory computer-readable medium storing code for wireless communication, the code comprising instructions executable by a processor to perform the method of one or more of Aspects 1-17.

Aspect 35: A non-transitory computer-readable medium storing a set of instructions for wireless communication, the set of instructions comprising one or more instructions that, when executed by one or more processors of a device, cause the device to perform the method of one or more of Aspects 1-17.

Aspect 36: An apparatus for wireless communication at a device, comprising a processor, memory coupled with the processor, and instructions stored in the memory and executable by the processor to cause the apparatus to perform the method of one or more of Aspects 18-30.

Aspect 37: A device for wireless communication, comprising a memory and one or more processors coupled to the memory, the one or more processors configured to perform the method of one or more of Aspects 18-30.

Aspect 38: An apparatus for wireless communication, comprising at least one means for performing the method of one or more of Aspects 18-30.

Aspect 39: A non-transitory computer-readable medium storing code for wireless communication, the code comprising instructions executable by a processor to perform the method of one or more of Aspects 18-30.

Aspect 40: A non-transitory computer-readable medium storing a set of instructions for wireless communication, the set of instructions comprising one or more instructions that, when executed by one or more processors of a device, cause the device to perform the method of one or more of Aspects 18-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A transmitter network node for wireless communication, comprising:
a memory; and
one or more processors coupled to the memory and configured to cause the transmitter network node to:
generate a guard interval (GI)-based orthogonal time frequency space (OTFS) waveform comprising at least one defined sequence associated with at least one GI in a time domain corresponding to the GI-based OTFS waveform; and
transmit at least one signal based on the GI-based OTFS waveform.

2. The transmitter network node of claim 1, wherein the at least one defined sequence comprises at least one of a head sequence or a tail sequence.

3. The transmitter network node of claim 1, wherein the at least one defined sequence comprises at least one set of zero samples.

4. The transmitter network node of claim 1, wherein the at least one defined sequence comprises at least one set of unique word samples.

5. The transmitter network node of claim 1, wherein the one or more processors, to cause the transmitter network node to generate the GI-based OTFS waveform, are configured to cause the transmitter network node to:
append at least one of a set of tail samples or a set of head samples to a set of data samples to generate a modified set of data samples; and
provide the modified set of data samples to a discrete Fourier transform (DFT) component.

6. The transmitter network node of claim 5, wherein a quantity of samples in the at least one of the set of tail samples or the set of head samples is based on a ceiling function associated with a quantity of samples in the GI-based OTFS waveform.

7. The transmitter network node of claim 1, wherein the one or more processors, to cause the transmitter network node to generate the GI-based OTFS waveform, are configured to cause the transmitter network node to:
provide a first set of data samples to a discrete Fourier transform (DFT) component;
generate a first transformed set of data samples using the DFT component;
generate a second transformed set of data samples using an inverse fast Fourier transform (IFFT) component; and
append a set of tail samples to the second transformed set of data samples.

8. The transmitter network node of claim 1, wherein the one or more processors, to cause the transmitter network node to generate the GI-based OTFS waveform, are configured to cause the transmitter network node to:
append at least one of a set of zero tail samples or a set of zero head samples to a set of data samples to generate a modified set of data samples;
provide the modified set of data samples to a discrete Fourier transform (DFT) component;
generate a first transformed set of data samples using the DFT component;
generate a second transformed set of data samples using an inverse fast Fourier transform (IFFT) component; and
append a set of unique word tail samples to the second transformed set of data samples.

9. The transmitter network node of claim 1, wherein the one or more processors are further configured to cause the transmitter network node to receive configuration information associated with the GI-based OTFS waveform, and wherein the one or more processors, to cause the transmitter network node to generate the GI-based OTFS waveform, are configured to cause the transmitter network node to generate the GI-based OTFS waveform based on the configuration information.

10. The transmitter network node of claim 9, wherein the one or more processors, to cause the transmitter network node to receive the configuration information, are configured to cause the transmitter network node to receive a radio resource control communication including the configuration information.

11. The transmitter network node of claim 1, wherein the one or more processors are further configured to cause the transmitter network node to receive an activation communication, and wherein the one or more processors, to cause the transmitter network node to generate the GI-based OTFS waveform, are configured to cause the transmitter network node to generate the GI-based OTFS waveform based on the activation communication.

12. The transmitter network node of claim 11, wherein the activation communication comprises at least one of a medium access control control element (MAC CE) or downlink control information (DCI).

13. The transmitter network node of claim 1, wherein the one or more processors, to cause the transmitter network node to transmit the at least one signal, are configured to cause the transmitter network node to transmit a plurality of signals comprising:
a first symbol comprising the GI-based OTFS waveform, the GI-based OTFS waveform comprising at least one of a zero header or a zero tail, and
a second symbol comprising an additional GI-based OTFS waveform, the additional GI-based OTFS waveform comprising at least one of a unique word header or a unique word tail.

14. The transmitter network node of claim 13, wherein the first symbol is transmitted before the second symbol, and wherein the one or more processors, to cause the transmitter network node to transmit the at least one signal, are configured to cause the transmitter network node to transmit a gap symbol between the first symbol and the second symbol.

15. The transmitter network node of claim 14, wherein the gap symbol comprises at least one of a GI-based orthogonal frequency division multiplexing (OFDM) signal or a GI-based discrete Fourier transform spread OFDM signal.

16. The transmitter network node of claim 13, wherein the first symbol is transmitted after the second symbol, and wherein the one or more processors, to cause the transmitter network node to transmit the at least one signal, are configured to cause the transmitter network node to transmit a tail-only symbol between the second symbol and the first symbol.

17. The transmitter network node of claim 16, wherein the tail-only symbol comprises at least one of a tail-only GI-based orthogonal frequency division multiplexing (OFDM) signal or a tail-only GI-based discrete Fourier transform spread OFDM signal.

18. A receiver network node for wireless communication, comprising:
a memory; and
one or more processors coupled to the memory and configured to cause the receiver network node to:
receive at least one signal based on a guard interval (GI)-based orthogonal time frequency space (OTFS) waveform comprising at least one defined sequence associated with at least one GI in a time domain; and
decode the at least one signal based on the at least one defined sequence.

19. The receiver network node of claim 18, wherein the at least one defined sequence comprises at least one of a head sequence or a tail sequence.

20. The receiver network node of claim 18, wherein the at least one defined sequence comprises at least one set of zero samples.

21. The receiver network node of claim 18, wherein the at least one defined sequence comprises at least one set of unique word samples.

22. The receiver network node of claim 18, wherein the one or more processors are further configured to cause the receiver network node to transmit configuration information associated with the GI-based OTFS waveform, wherein the GI-based OTFS waveform is based on the configuration information.

23. The receiver network node of claim 18, wherein the one or more processors are further configured to cause the receiver network node to transmit an activation communication, wherein the GI-based OTFS waveform is based on the activation communication.

24. The receiver network node of claim 18, wherein the one or more processors, to cause the receiver network node to receive the at least one signal, are configured to cause the receiver network node to receive a plurality of signals comprising:
a first symbol comprising the GI-based OTFS waveform, the GI-based OTFS waveform comprising at least one of a zero header or a zero tail, and
a second symbol comprising an additional GI-based OTFS waveform, the additional GI-based OTFS waveform comprising at least one of a unique word header or a unique word tail.

25. The receiver network node of claim 24, wherein the first symbol is received before the second symbol, and wherein the one or more processors, to cause the receiver network node to receive the at least one signal, are configured to cause the receiver network node to receive a gap symbol between the first symbol and the second symbol.

26. The receiver network node of claim 24, wherein the first symbol is received after the second symbol, and wherein the one or more processors, to cause the receiver network node to receive the at least one signal, are configured to cause the receiver network node to receive a tail-only symbol between the second symbol and the first symbol.

27. A method of wireless communication performed by a transmitter network node, comprising:
generating a guard interval (GI)-based orthogonal time frequency space (OTFS) waveform comprising at least one defined sequence associated with at least one GI in a time domain corresponding to the GI-based OTFS waveform; and
transmitting at least one signal based on the GI-based OTFS waveform.

28. The method of claim 27, wherein the at least one defined sequence comprises at least one of a head sequence or a tail sequence.

29. A method of wireless communication performed by a receiver network node, comprising:
receiving at least one signal based on a guard interval (GI)-based orthogonal time frequency space (OTFS) waveform comprising at least one defined sequence associated with at least one GI in a time domain; and
decoding the at least one signal based on the at least one defined sequence.

30. The method of claim 29, wherein the at least one defined sequence comprises at least one of a head sequence or a tail sequence.

* * * * *